United States Patent [19]

Guimond et al.

[11] 4,285,121
[45] Aug. 25, 1981

[54] METHOD OF MAKING STORAGE BATTERIES OF THE LEAD-ACID CLASS

[75] Inventors: Roy A. Guimond, Holden; Nanci W. Reed, Sudbury; John E. Gulliksen, Shrewsbury, all of Mass.

[73] Assignee: Koehler Manufacturing Company, Marlborough, Mass.

[21] Appl. No.: 61,063

[22] Filed: Jul. 26, 1979

Related U.S. Application Data

[62] Division of Ser. No. 949,890, Oct. 10, 1978, Pat. No. 4,202,936.

[51] Int. Cl.³ .......................................... H01M 10/12
[52] U.S. Cl. ........................................ 29/623.1; 29/2
[58] Field of Search ..................... 29/623.1, 623.5, 2; 429/233-244, 225-228, 204, 208, 163

[56] References Cited

U.S. PATENT DOCUMENTS

| 627,134 | 6/1899 | McDougall | 429/234 |
|---|---|---|---|
| 1,364,011 | 12/1920 | Smith | 429/239 |
| 2,616,938 | 11/1952 | Brandt | 429/234 |
| 3,011,007 | 11/1961 | Evers et al. | 429/225 |
| 3,083,250 | 3/1963 | Geissbauer | 429/234 |
| 3,652,340 | 3/1972 | Sharpe | 429/225 |
| 3,738,871 | 6/1973 | Scholle | 429/234 |
| 4,093,785 | 6/1978 | Sassmannshausen et al. | 429/225 |
| 4,121,019 | 10/1978 | Garrett, Jr. | 429/225 |

FOREIGN PATENT DOCUMENTS 1429189  3/1976  United Kingdom ............... 429/234

*Primary Examiner*—Daniel C. Crane
*Attorney, Agent, or Firm*—Munroe H. Hamilton

[57] ABSTRACT

An improved storage battery of the lead-acid class includes grid structures provided with grid complement means in the form of enclosure bodies of a chemically inert material selectively arranged about portions of the grid structure to protectively reinforce same. These protectively reinforced grid structures, embodied in either a negative plate or a positive plate, may be utilized advantageously in making and operating the lead-acid battery, and are desirable for plates in which an active material is contained in tubes or occurs in pasted form. The enclosure bodies may be a material impermeable to electrolyte. Where the grid structure for a positive plate is provided with an antimony content, the enclosure bodies constitute a barrier which substantially inhibits release of antimony from all portions of the grid structure which are not in contact with the active material. There is thus achieved a lead-acid battery having the advantages of an antimony-free battery requiring little or no maintenance on the one hand, and a battery with an antimony content in its grid structure which imparts reinforced grid strength and long operating life under deep discharge conditions on the other hand, particularly with respect to positive plates. Certain desirable forms of the enclosure bodies may include means whereby corrosion of some parts of the positive grid structure is inhibited by lengthening the path of sulfate ion flow to the parts where corrosion may occur. It should be noted that the sulfate ion flow to these portions of the grid should be limited only to an extent such that no soluble lead hydrates are formed. Battery plates may be combined with the grid complement means and when so combined may be electrochemically formed or charged in an improved manner.

3 Claims, 77 Drawing Figures

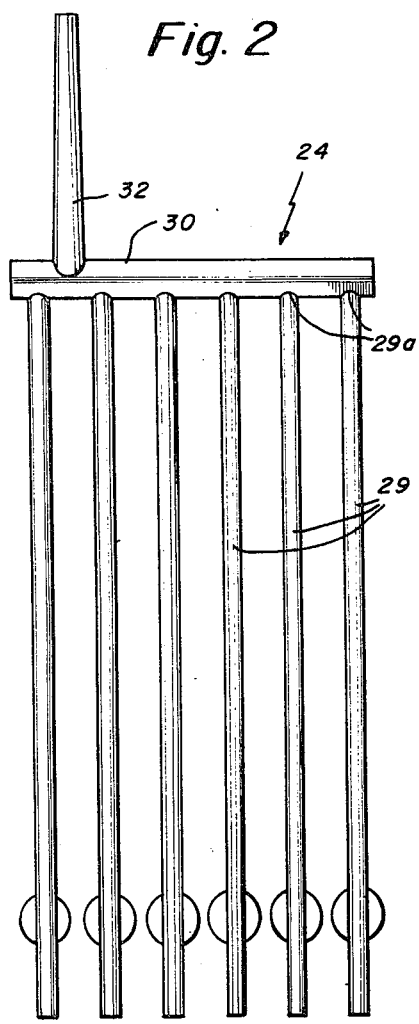
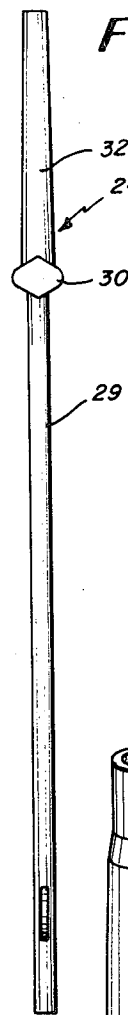
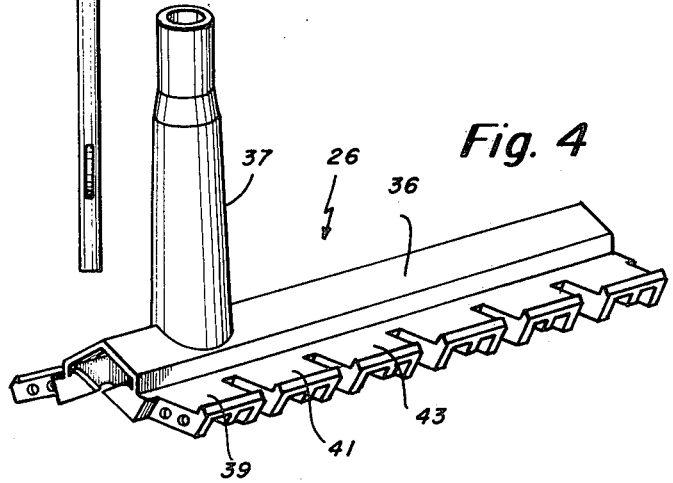
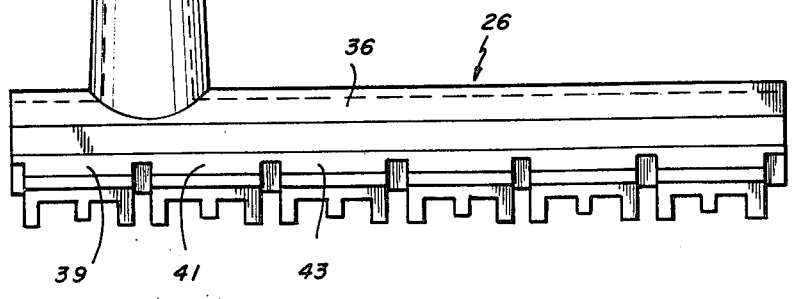

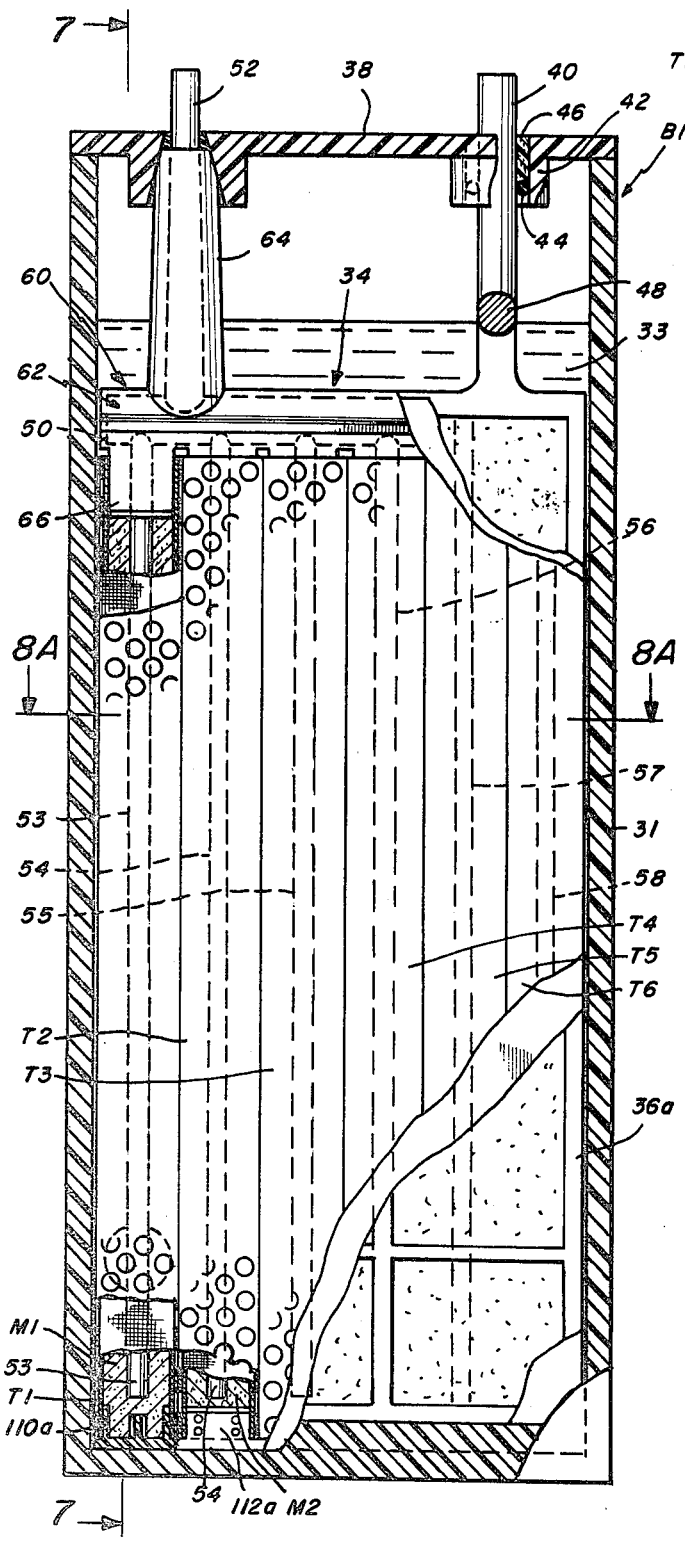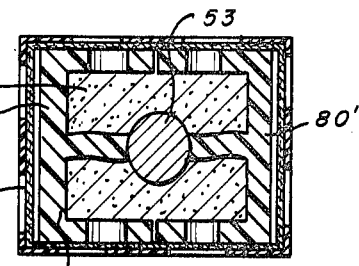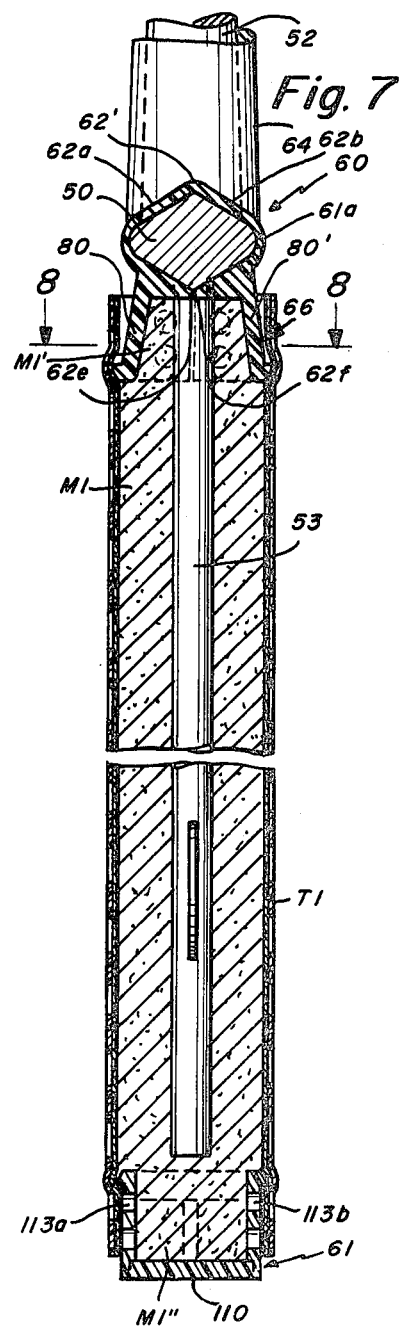

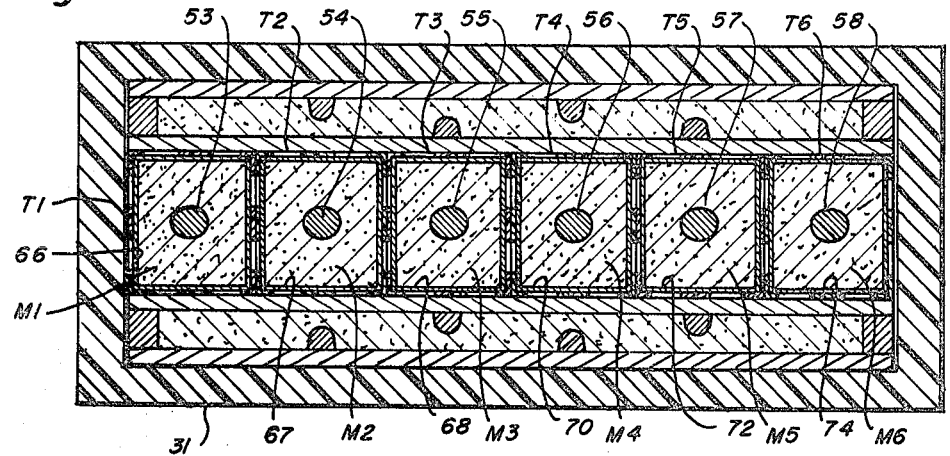
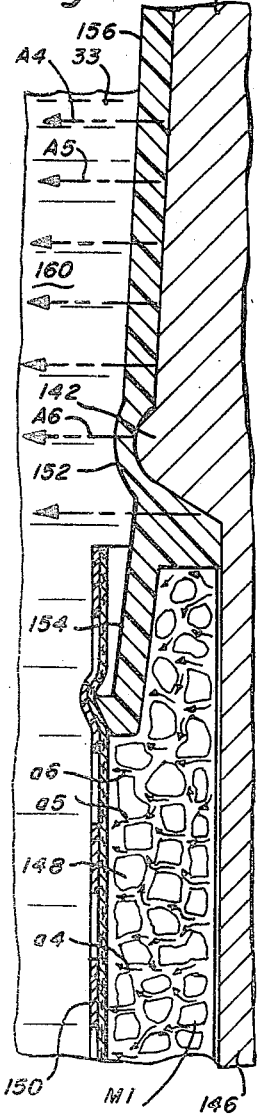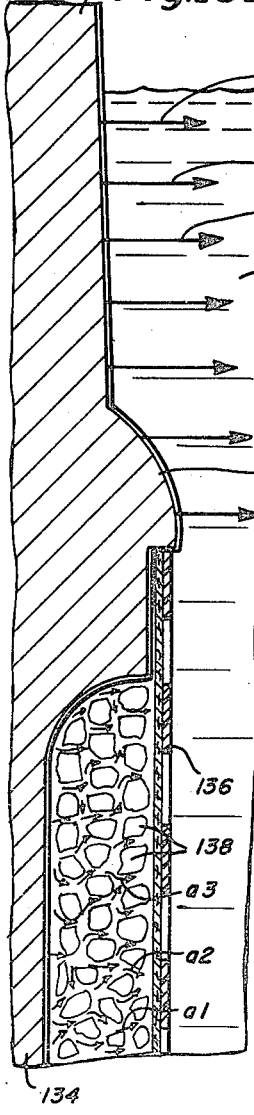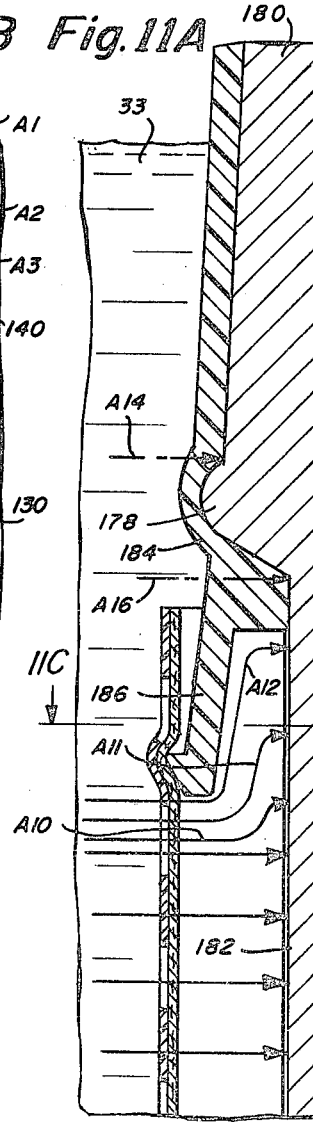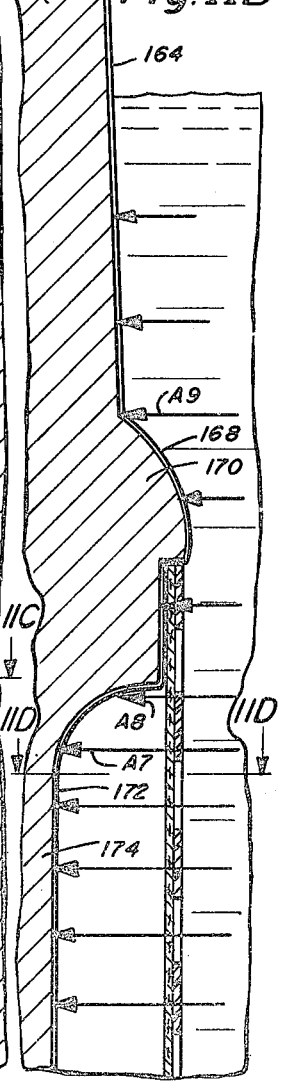

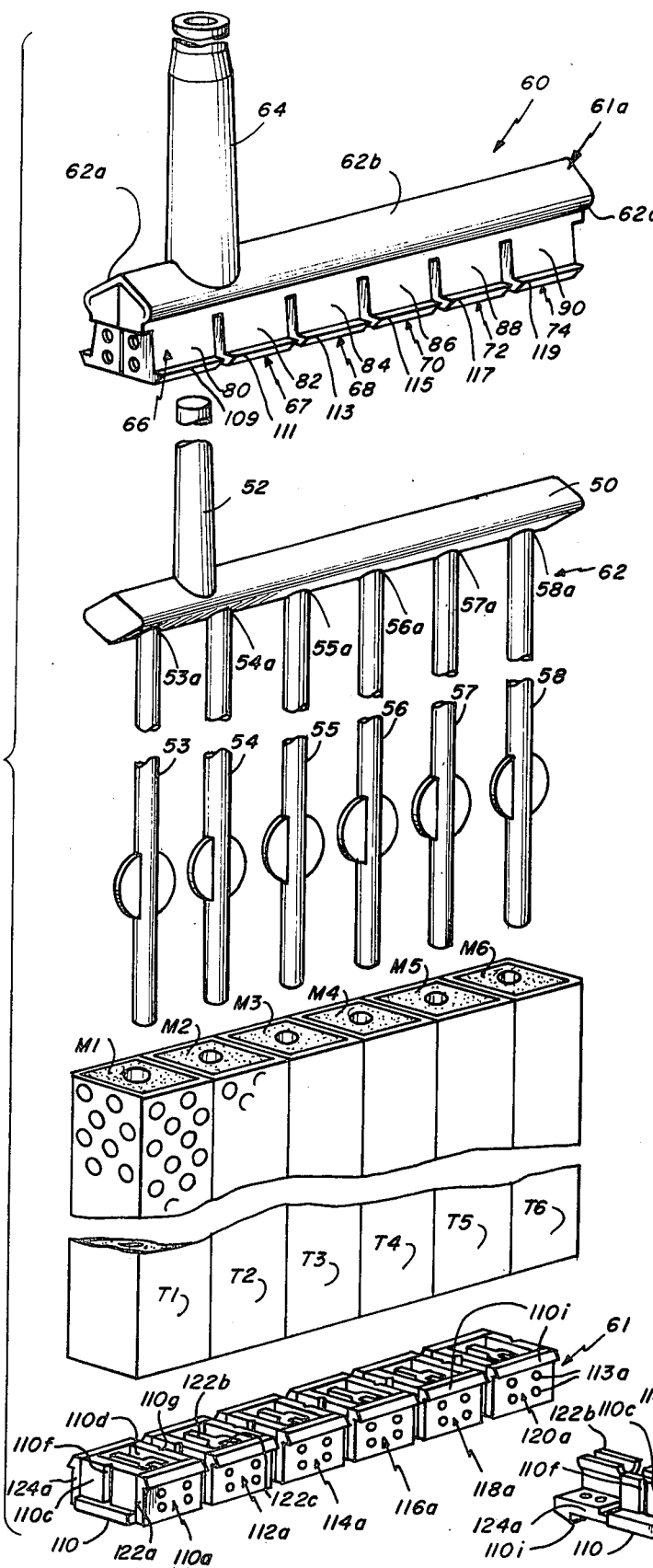
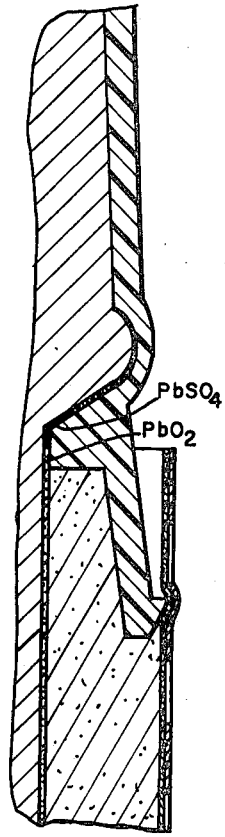
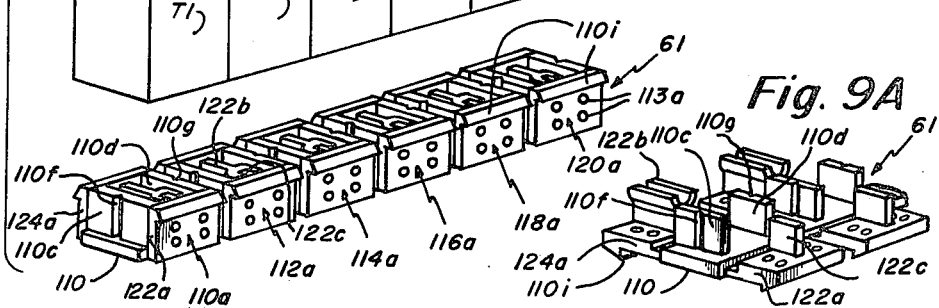
Fig. 9
Fig. 9B
Fig. 9A

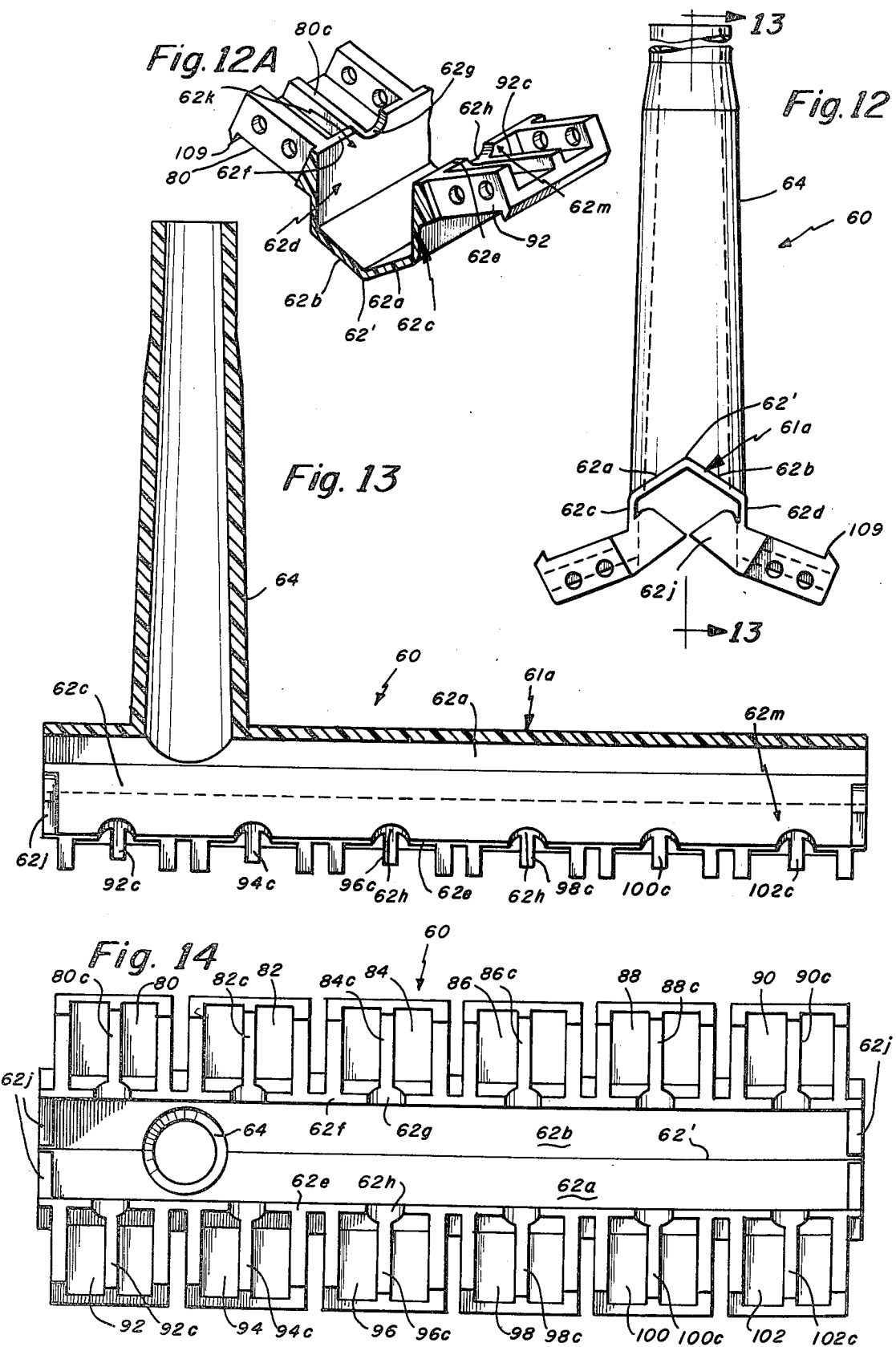

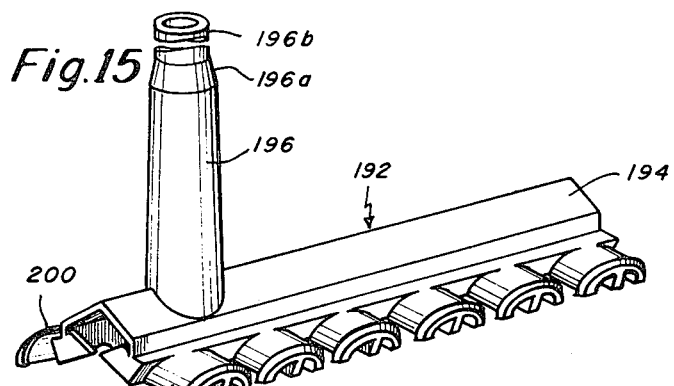
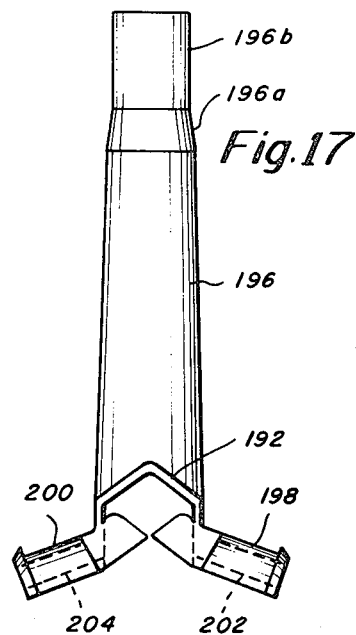
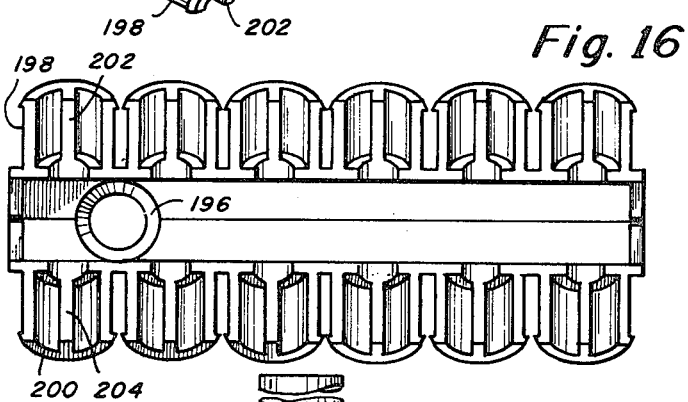
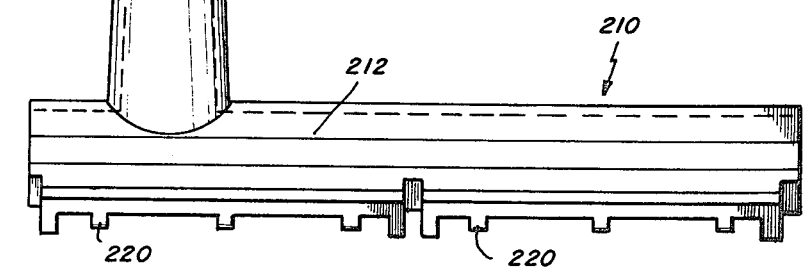
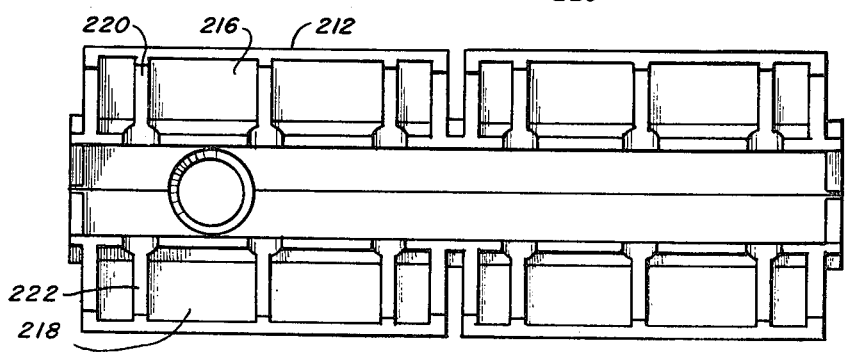

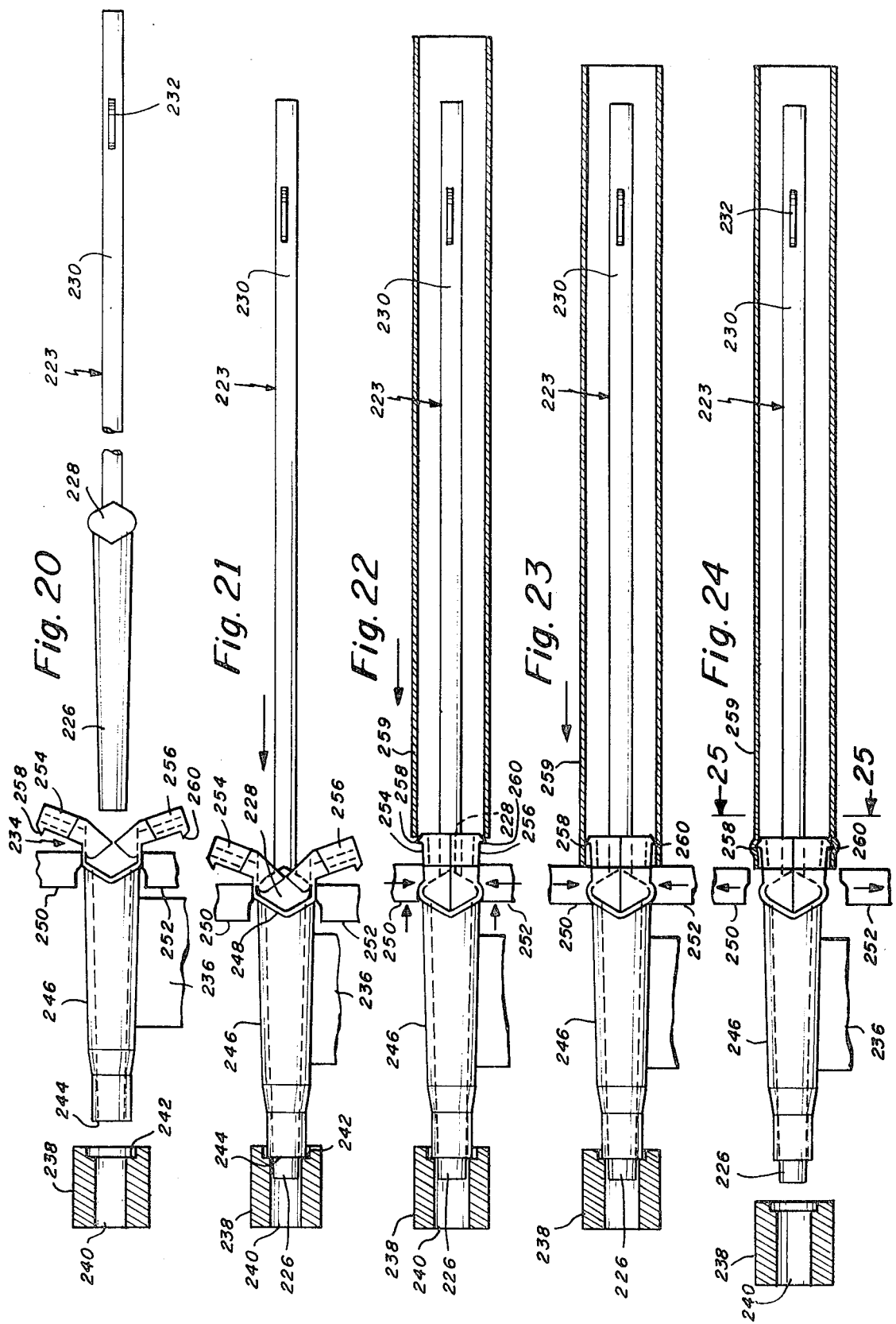

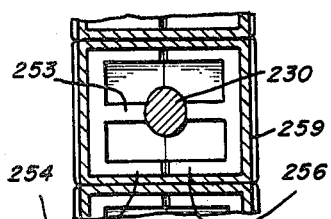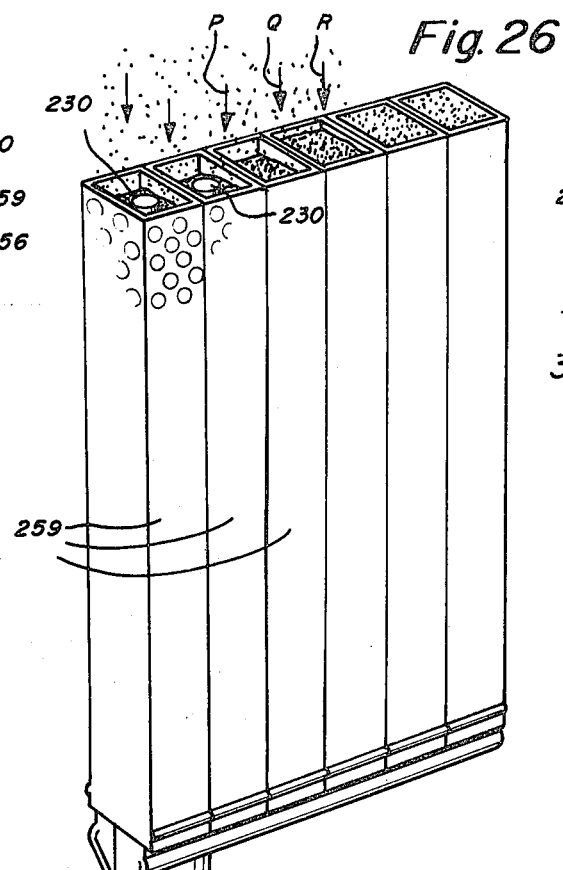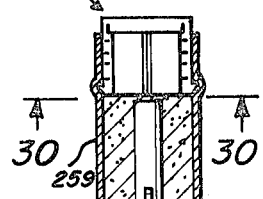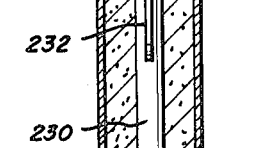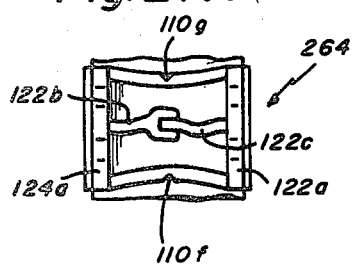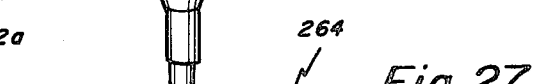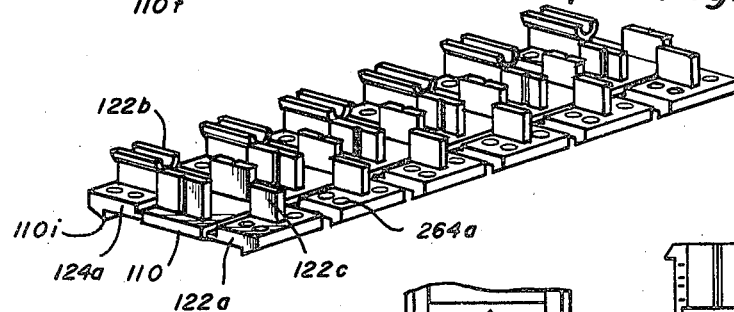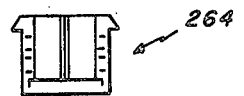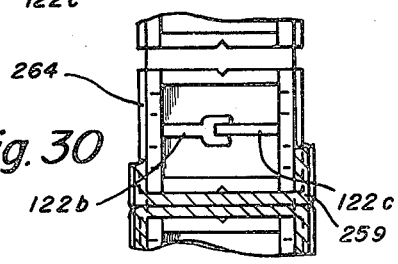

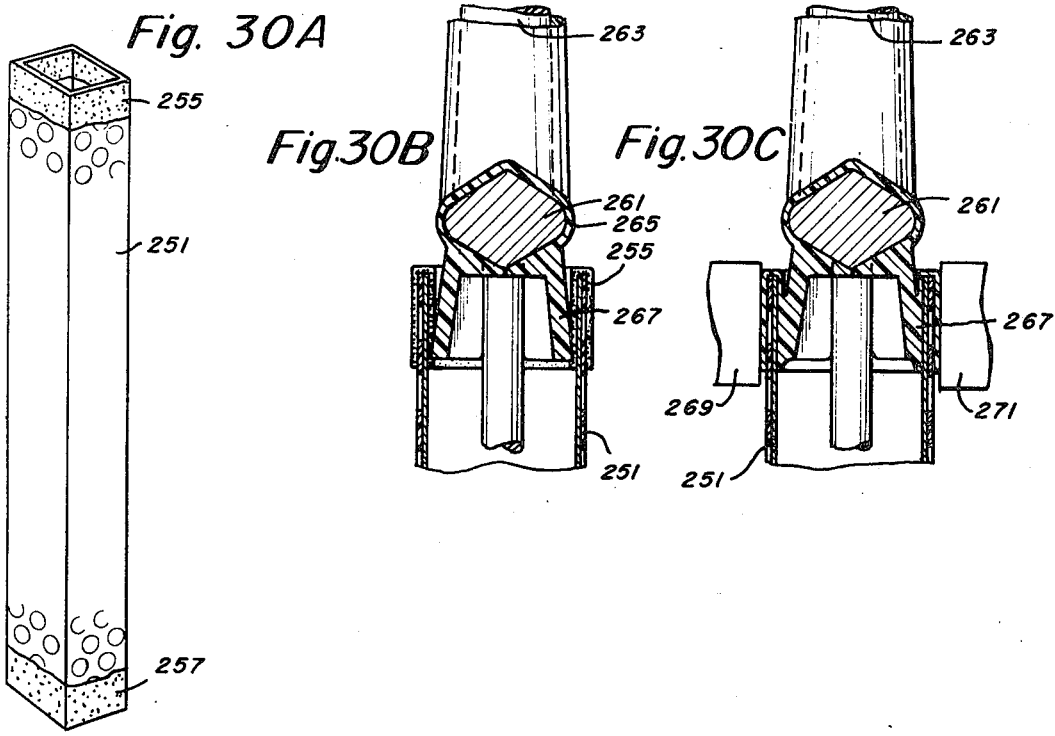
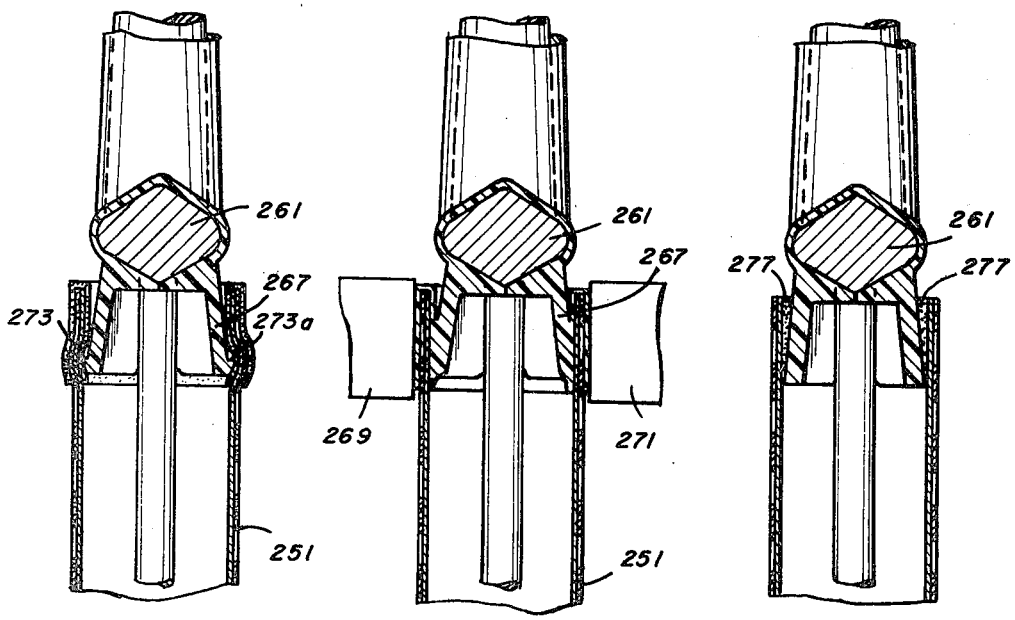

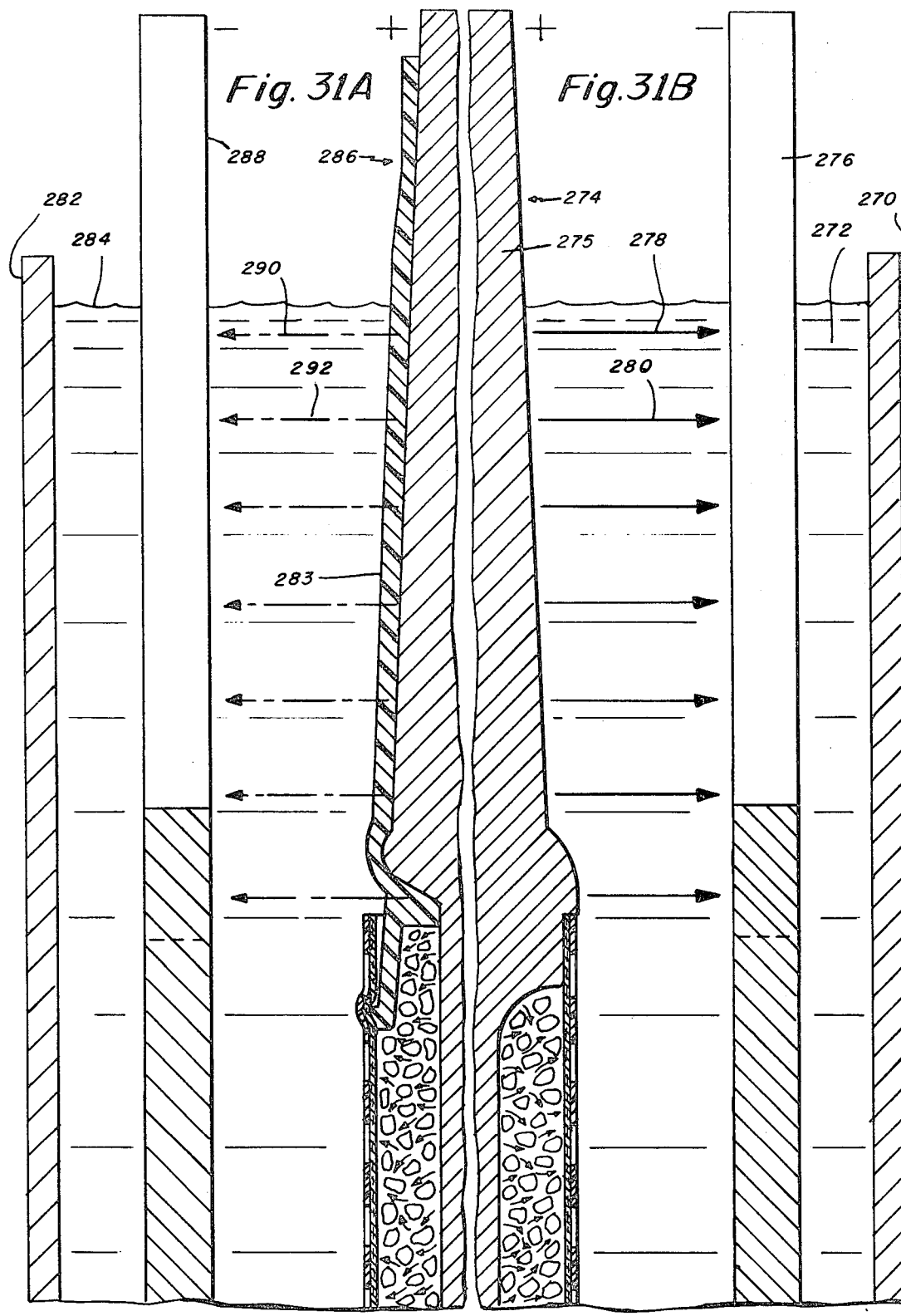

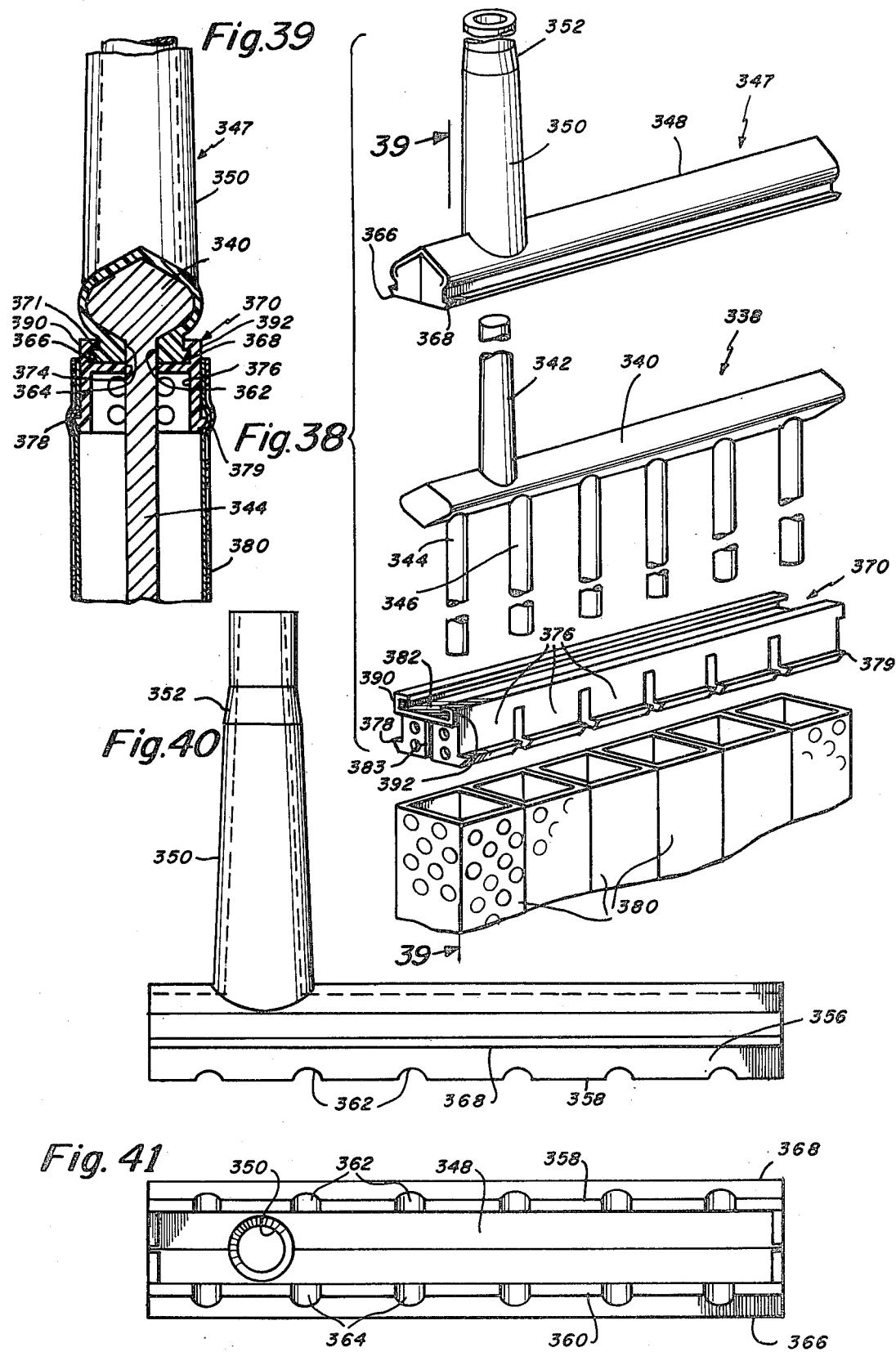

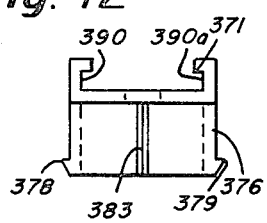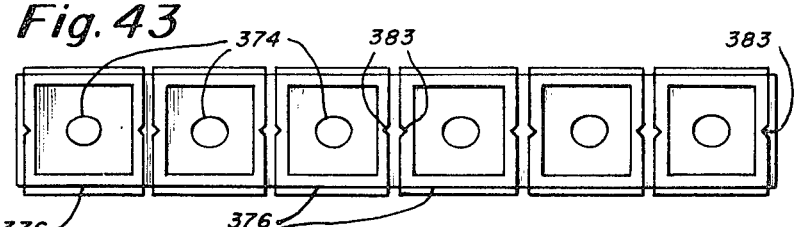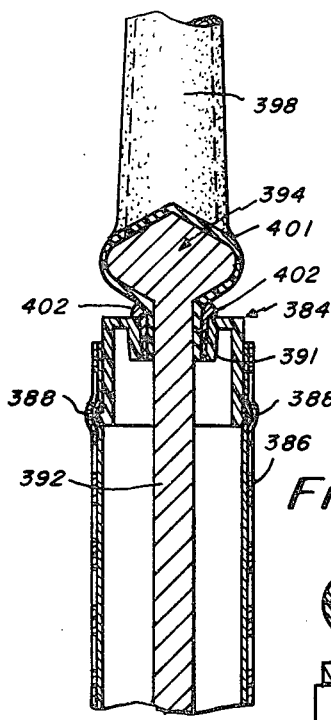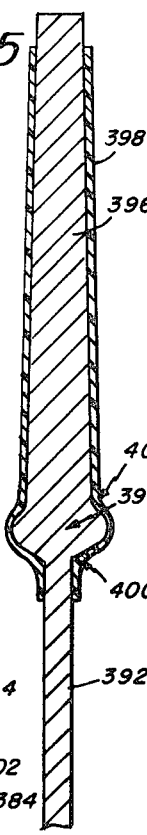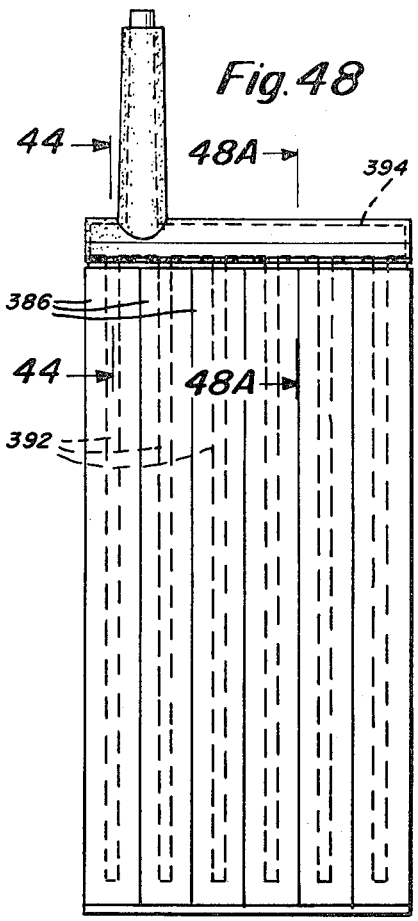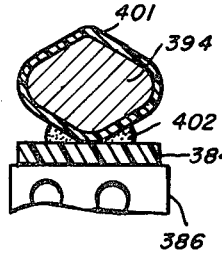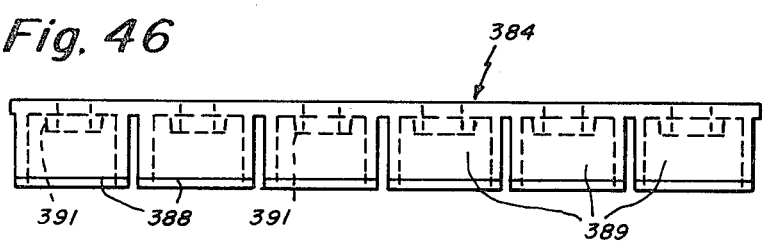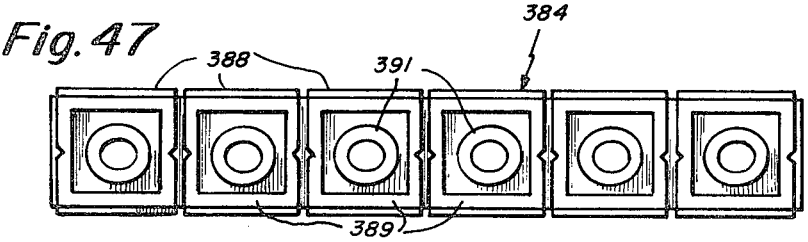

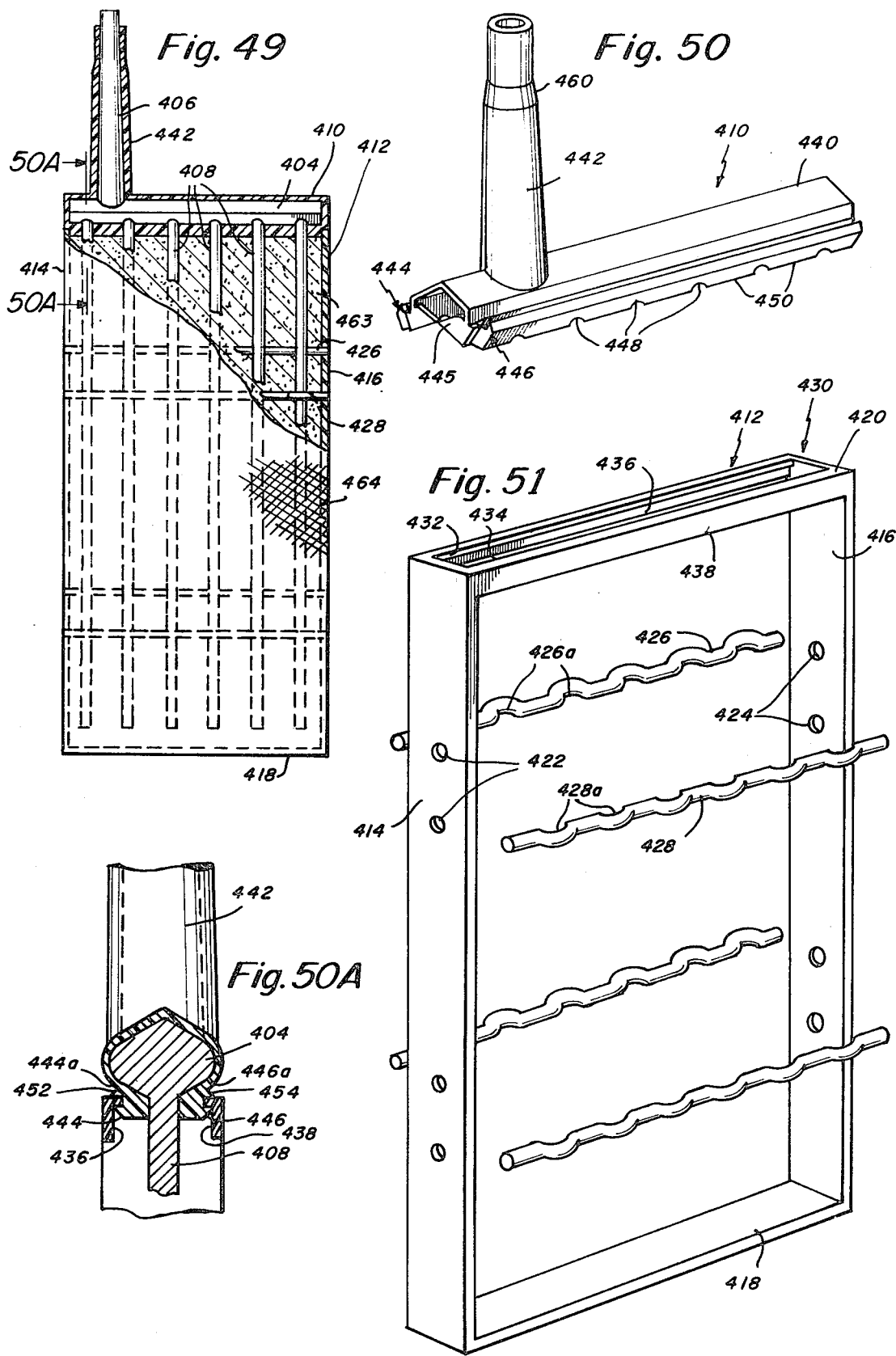

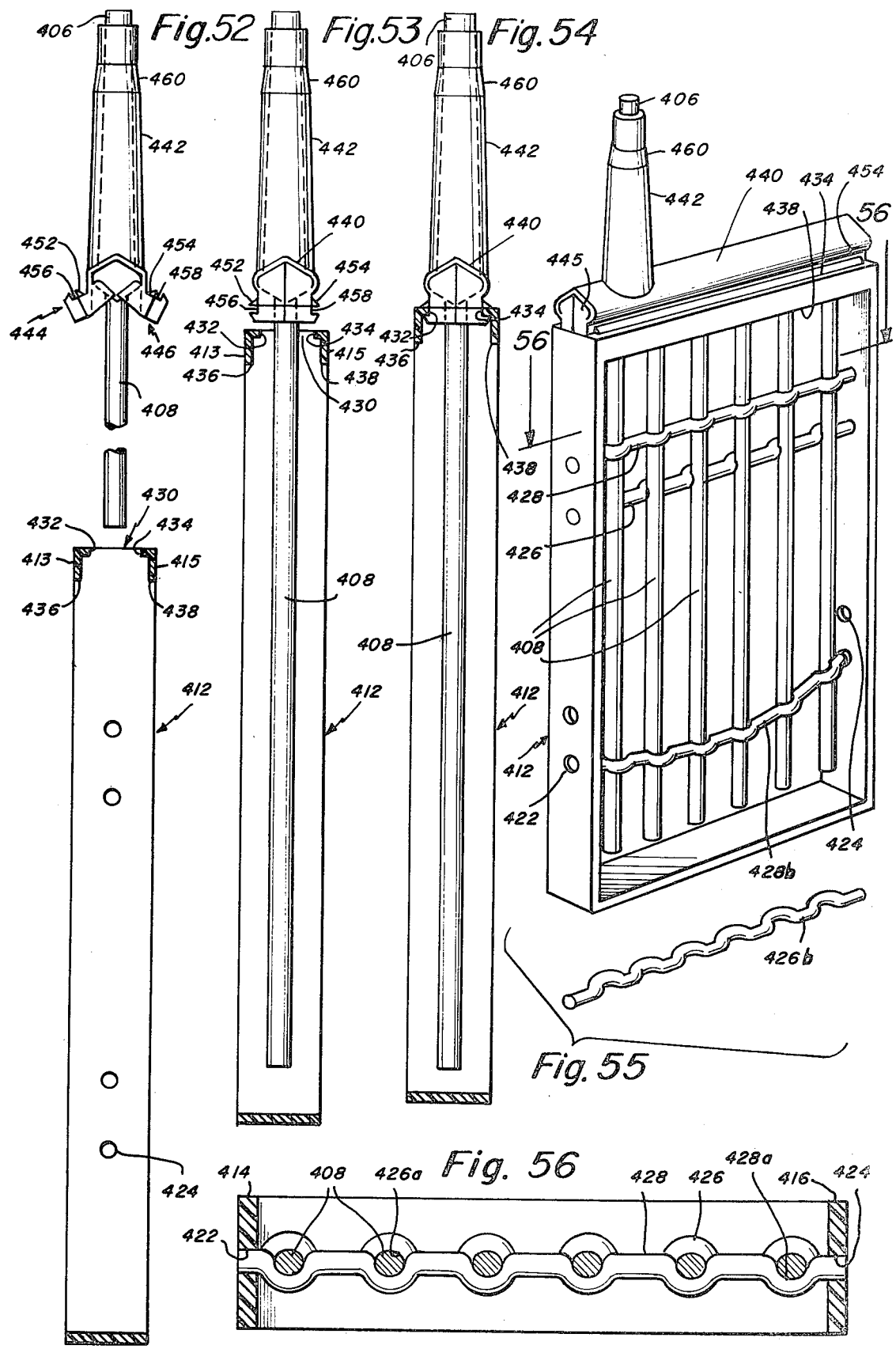

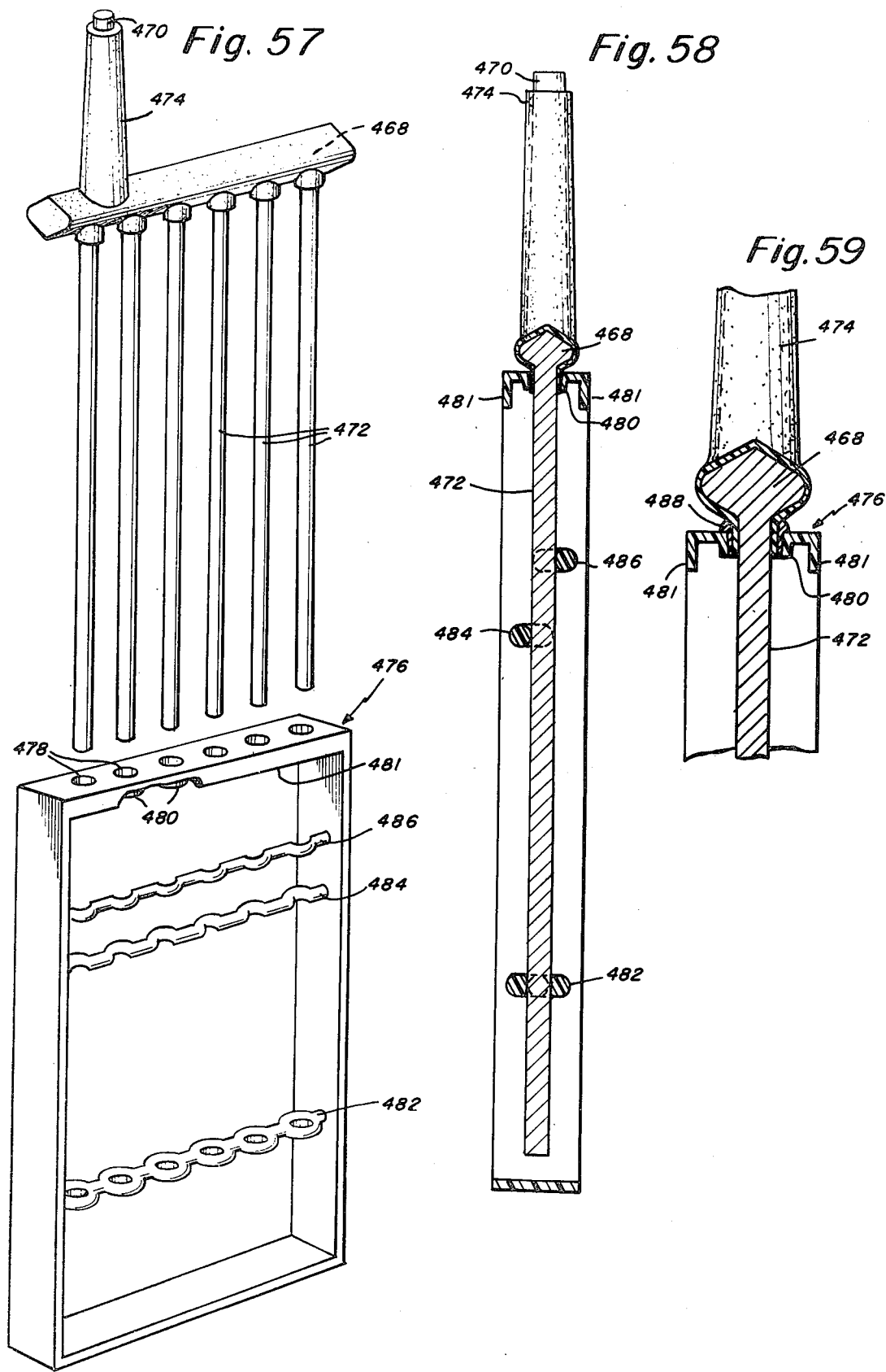

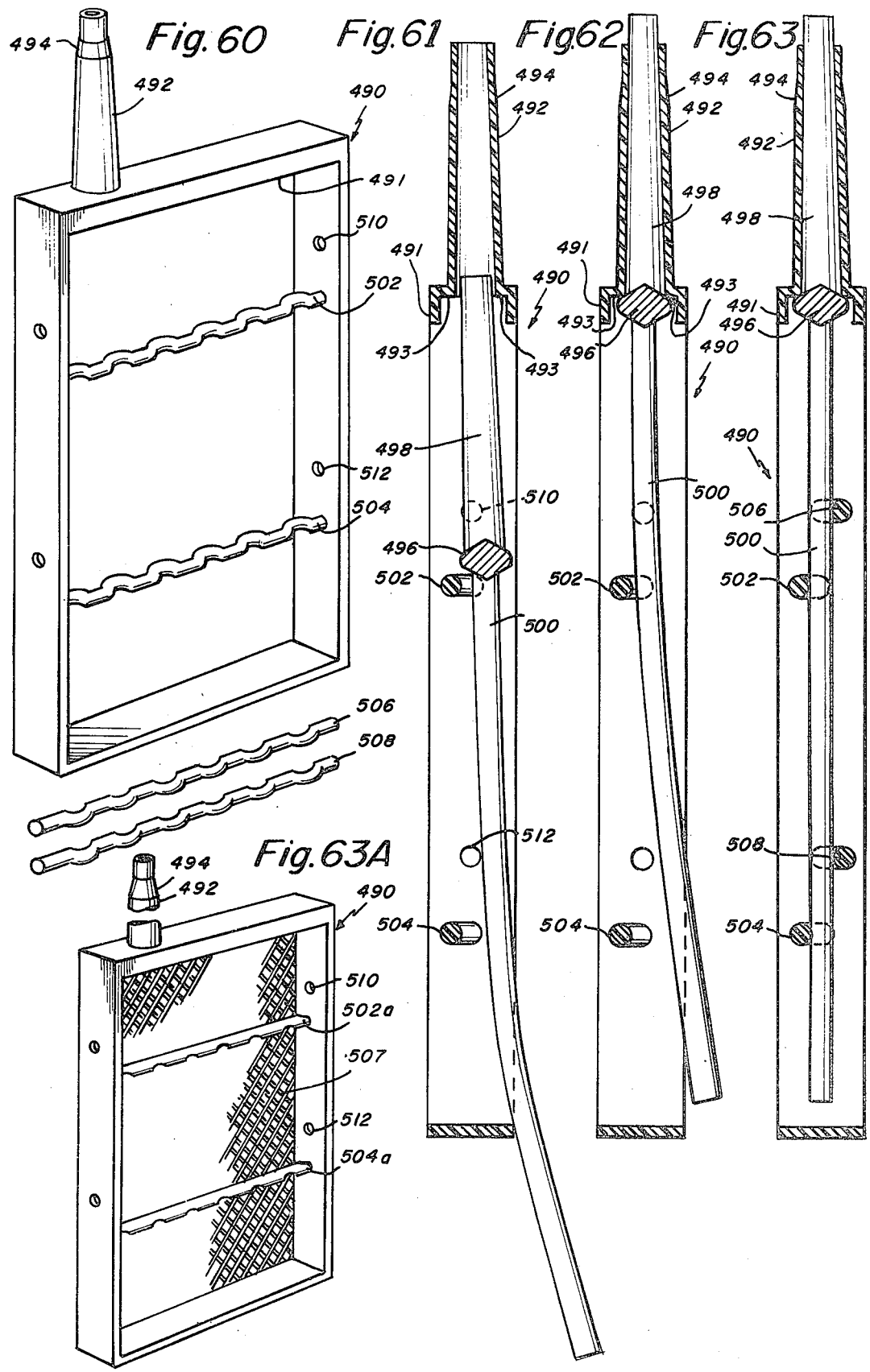

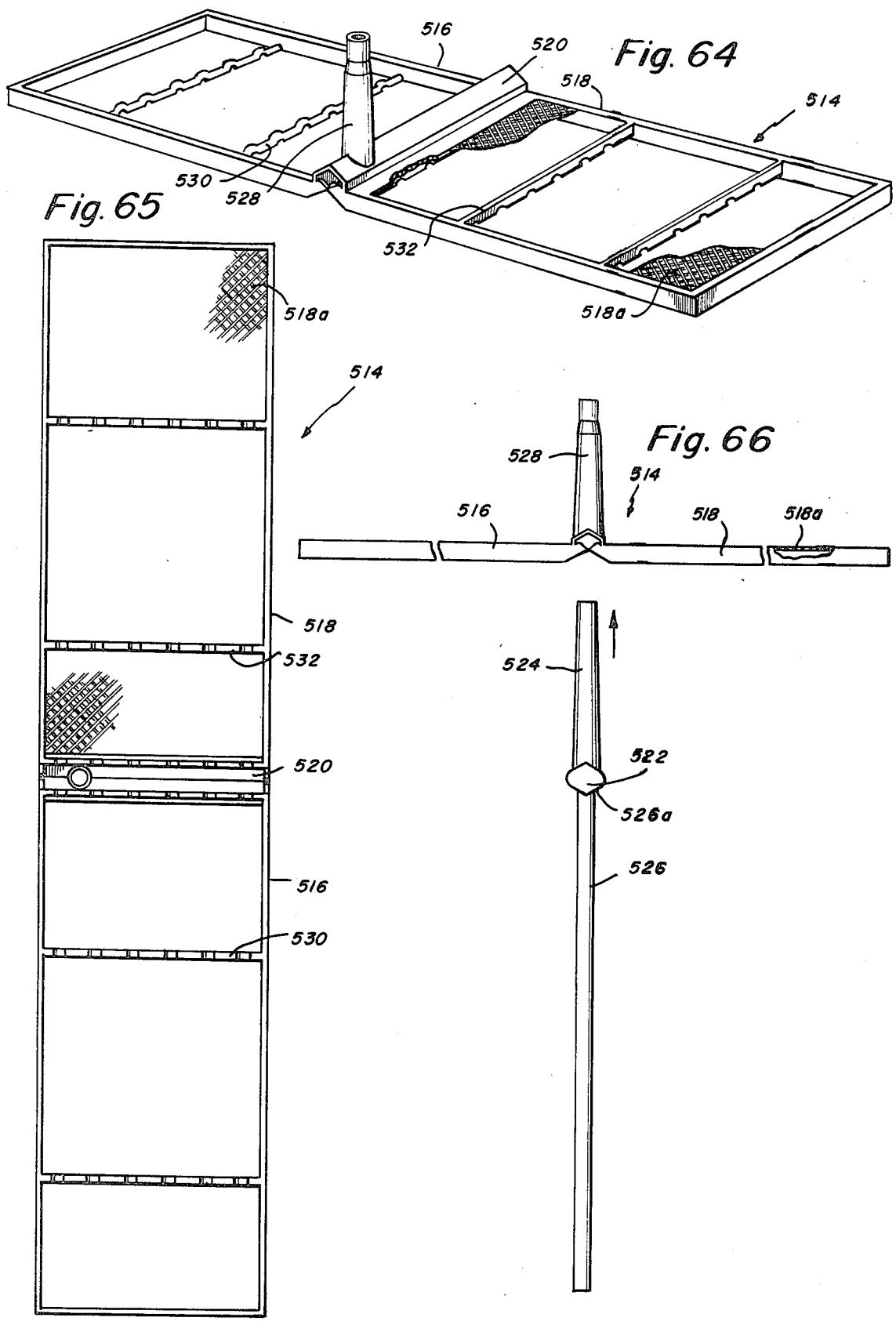

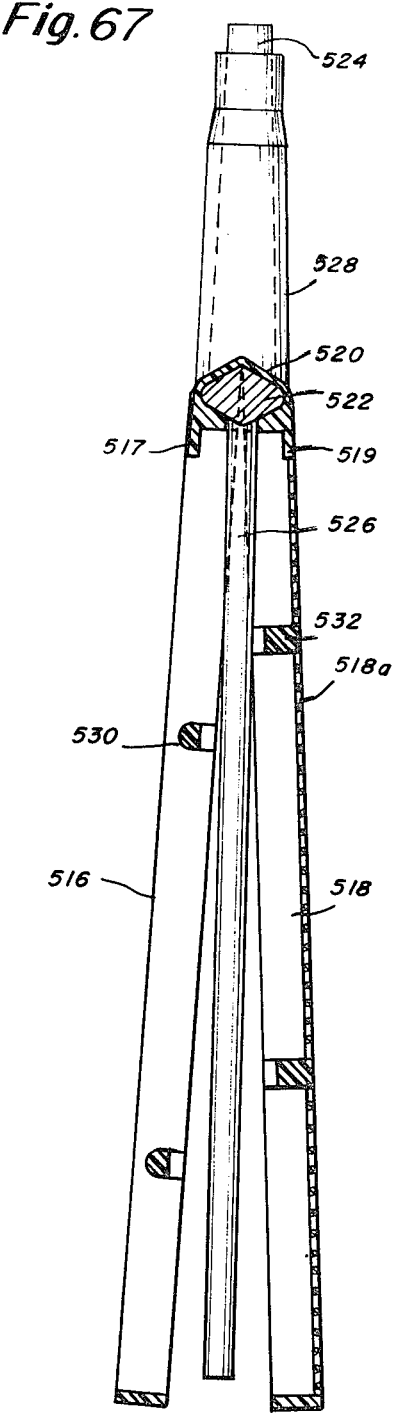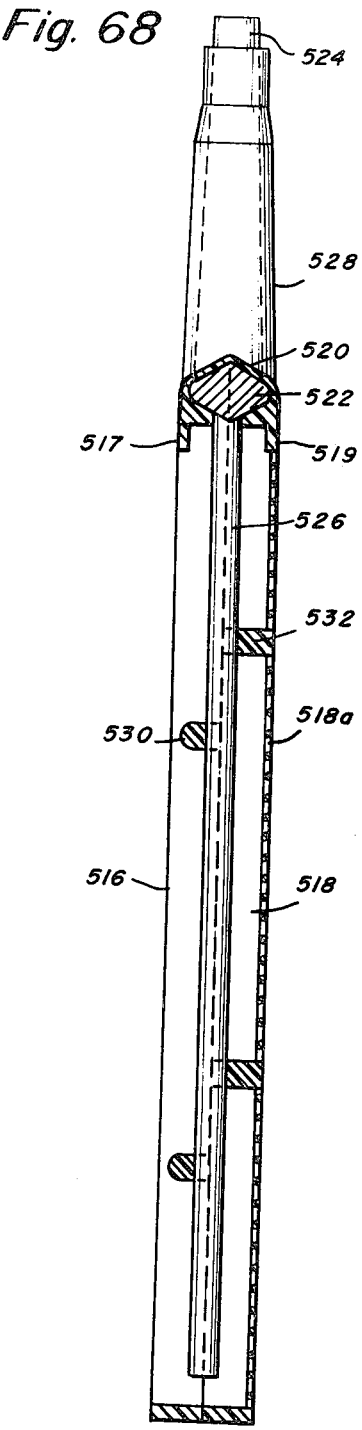

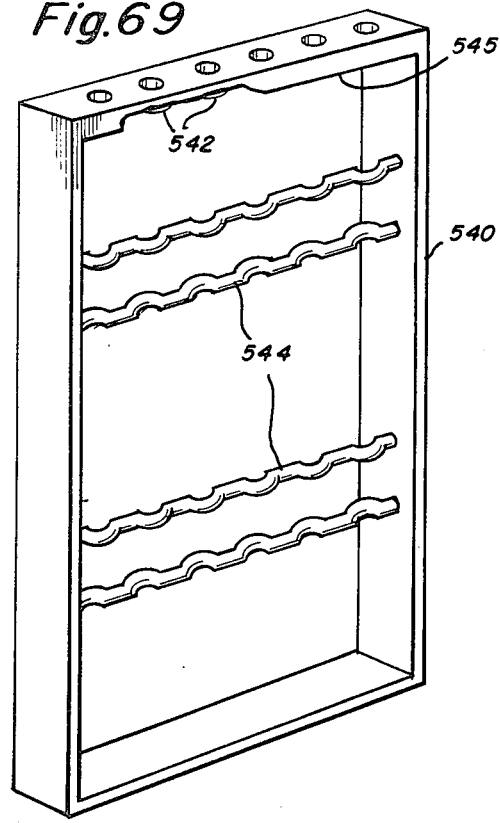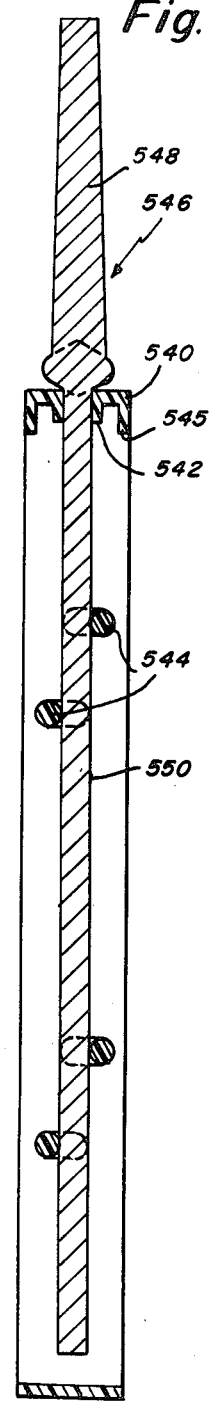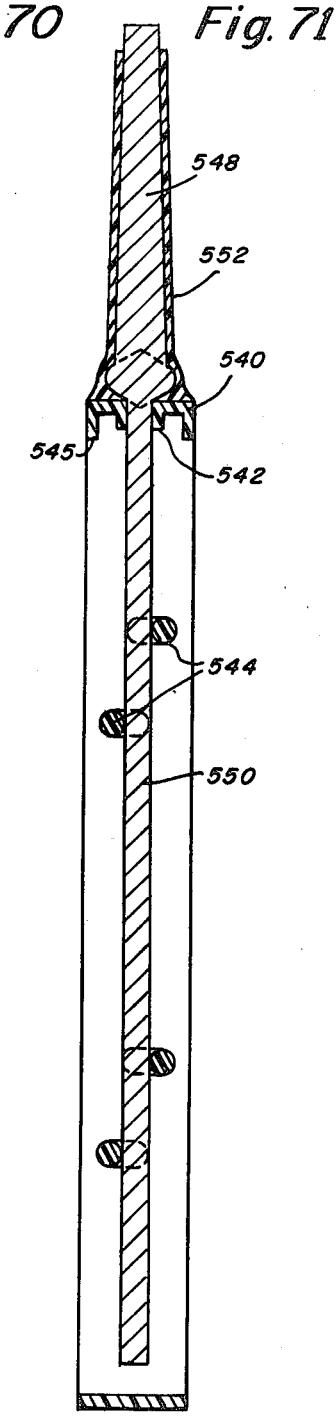

Fig. 75
Fig. 75A
Fig. 76
Fig. 76A
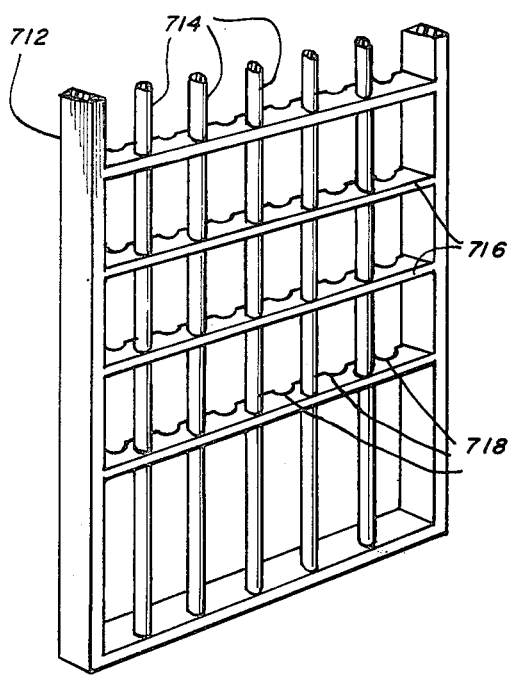
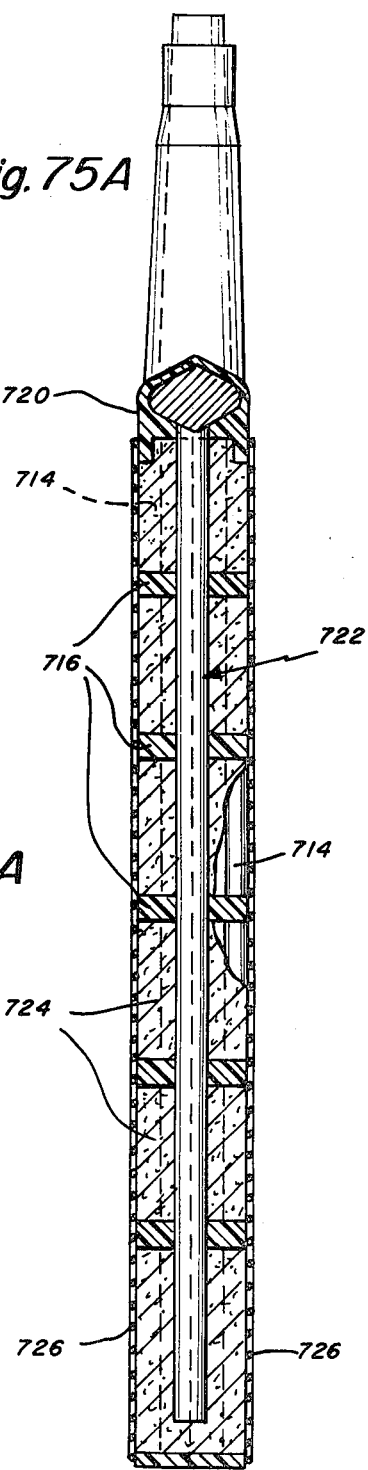
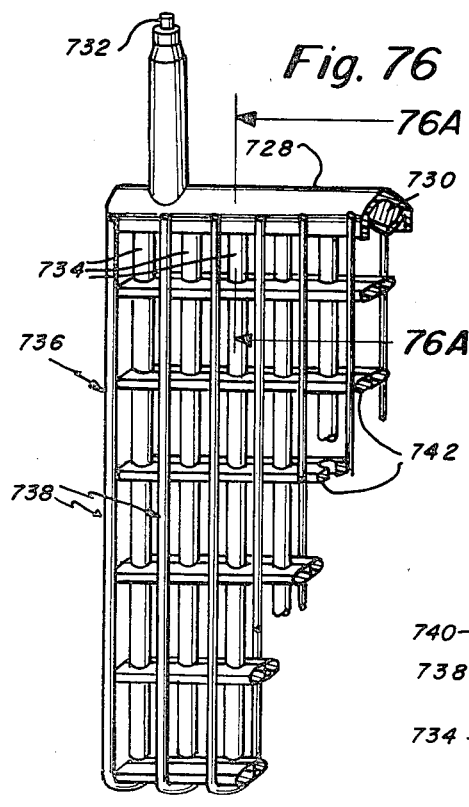
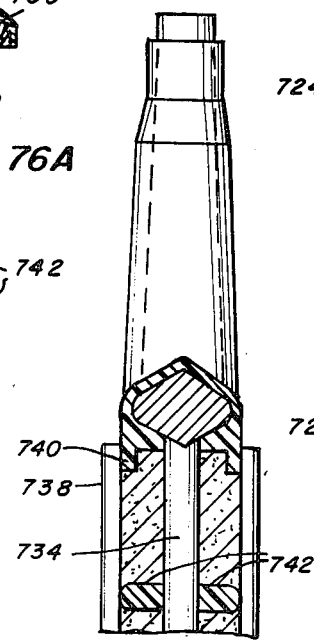

METHOD OF MAKING STORAGE BATTERIES OF THE LEAD-ACID CLASS

This is a division of application Ser. No. 949,890, filed Oct. 10, 1978, now U.S. Pat. No. 4,202,936, issued May 13, 1980.

BACKGROUND OF THE INVENTION

Storage batteries of the lead-acid class customarily include positive and negative plates having grid structures which are supported in spaced relation in an electrolyte with an active material located around portions of the grid structures. As is well known by those skilled in the art, electrical energy is converted into chemical energy which is stored in the battery during charging and reconverted into electrical energy when the battery is discharged by means of the well known double sulfate reactions.

In such a battery corrosion of the positive grid structure tends to occur at vulnerable areas particularly at those points where internal stresses have been created during manufacture of the grid. These stresses tend to be maximized at "inside corners" of the lead alloy grid structure, i.e., those portions of the grid structure where surfaces intersect at some angle less than 180°. In this way battery life becomes materially shortened.

In providing a battery of longer operating life particularly under deep cycling conditions, it has been proposed to utilize a positive grid structure having an antimony grid content. However, while antimony improves the functioning of the active material at the positive plate, particularly under deep discharge, as well as strengthening the grid structure, a problem may arise. During charging the surfaces of the positive grid structure will release antimony. Some of this antimony is released from those positive grid surfaces in contact with active material in which it will be released. The remaining antimony released, i.e., that released without inhibition from grid surfaces not covered by active material, will be electrochemically attracted to the negative plate and deposited thereon producing contamination of the negative active material. When this contamination of the negative active material takes place, battery life is again significantly shortened. Also during discharge, antimony will be released from the surfaces of the negative grid structure into the electrolyte, and during recharge, will be electrochemically redeposited on the surfaces of the negative plate including its active material (which has a substantially greater area) thus causing similar contamination and subsequent shortening of battery life.

This shortening of battery life occurs because the electrical potential required to disassociate the hydrogen and oxygen components of the electrolyte due to electrolysis is materially lowered by such contamination. This in turn necessitates more frequent addition of water to the electrolyte and, when the battery is to be charged to a constant potential or "back EMF", a greater portion of the charging current is used up by gassing (electrolysis) and overcharging of the battery plates. Since overcharge is the primary cause of battery failure and, since gassing will increase the specific gravity of the electrolyte thereby accelerating corrosion of the positive grid parts, it will readily be seen that material reduction of antimony contamination of the negative active material will substantially increase battery life.

In addition, when the surfaces of a grid having an antimony content are exposed to the electrolyte during electrochemical formation and subsequent charging, a poisonous gaseous compound known as stibine ($SbO_3$) may be released from the cell into the atmosphere. This may become an occupational hazard in some cases and furthermore, if a battery with grids having an antimony content is provided with a catalytic recombination device of conventional nature, poisoning of the catalytic device may result thus causing failure of the recombination process.

Also in conventional practice, when electrochemically forming positive and negative plates in an acid bath and the positive plate grid structure has an antimony content, it is necessary to employ separate formation containers for the positive and negative plates.

Furthermore, when electrochemically forming a positive plate in an acid bath as noted, its post or burning lug becomes coated with a film of $PbO_2$. This coating of film must be removed with added expense and trouble in order to provide a clean lead surface for burning or for attaching a terminal clamp.

Finally, if a battery having a low maintenance characteristic is constructed having grid structures formed with little if any antimony content, these grid structures are relatively soft which presents difficulties in plate manufacture and which invites strengthening in some manner.

Various attempts have been made in the art to solve the corrosion problems indicated. However, an extensive study of prior art disclosures has failed to uncover a lead-acid battery construction wherein there is found a grid structure and grid complement means in the form of an enclosure body which overlies and protectively reinforces all portions of a grid structure not in contact with active material.

It is well known in the art to utilize a protective means at certain points in a battery of the lead-acid class.

For example, U.S. Pat. No. 1,128,232 discloses a top bar and lug protector for a flat plate design which snaps into position, but as noted in line 57, page 2, the lug protection extends only to the strap.

U.S. Pat. No. 1,171,597 shows a top protector that slips over plate and separators to hold the parts together. However, the patent stresses openings 4 to permit electrolyte circulation rather than preventing it U.S. Pat. No. 1,051,147 shows protector means for frame and top bar parts of a flat or pasted plate but does not protect post means.

U.S. Pat. No. 1,379,854 dicloses a celluloid sleeve shrunk over post means only and cemented to the cell cover.

U.S. Pat. No. 1,580,596 discloses a post projector molded on the underside of the cell cover and enjoins the strap member but no protection for grid surfaces.

U.S. Pat. No. 2,120,822 discloses protective sleeves for the post means of a mine lamp battery and has no grid protection.

U.S. Pat. No. 1,940,976 discloses perforated protector means for a grid and no protection for the lug.

Other patents disclosing partially protected grid structures include U.S. Pat. Nos. 2,420,456, 2,647,157, 2,570,677, 1,605,968, 1,586,406, 1,422,815, 3,944,432, 1,364,011, 1,158,491, 3,247,023, 2,490,630 and 3,813,300.

None of these patents appear to disclose the concept of combining a grid structure with grid complement means arranged to protectively enclose all surfaces of the grid structure which are not in contact with active material so as to retard corrosion and in some cases prevent release of antimony at some of the grid surfaces.

BRIEF DESCRIPTION OF THE INVENTION

The present invention relates generally to improvements in lead-acid batteries and methods of making and operating same.

An object of the invention is to provide a lead-acid battery construction which includes a means for successfully dealing with various problems resulting from corrosion or formation of PbO2 on grid surfaces.

Another object is to design protective enclosure bodies which may be formed as molded plastic parts and which are constructed of a shape suitable for overlying and mating with all portions of a grid structure which are not in contact with active material including specifically the top bar and spine portions of the grid structures as well as its post means.

Another specific object of the invention is to devise a method of operating a lead-acid battery utilizing either a tubular type positive plate or a pasted type positive plate which method is characterized by the low maintenance or maintenance-free performance of a lead-acid battery having no antimony in its positive plate grid structure on the one hand and the relatively long-operating life under deep discharge conditions of a positive plate whose grid structure has an antimony content on the other hand.

A further object of the invention is to devise an improved positive plate having components which may be assembled in a unique manner to impart increased grid strength, reduced weight and increased resistance to corrosive action during normal battery operation.

Still another object is a method of electrochemically forming both negative and positive plates, where the positive plate has a grid structure with an antimony content, in a common container and acid bath without contamination of the negative active material.

To attain the foregoing objectives as well as other advantages, there has been devised plate means having an improved grid design and a grid complement which is shaped to mate with all surfaces of the grid design which are not normally in contact with an active material. When the grid complement is completely assembled over the grid design, its surfaces are engaged in a manner such that little, if any, reaction or charge-discharge activity can take place on underlying lead surfaces.

In one preferred form, where the plate means is a positive plate, the grid complement comprises a resilient enclosure body of a chemically inert material which when in place may exert compressive forces of a magnitude sufficient to retard contact of the electrolyte body with the positive plate grid means thus limiting release of antimony from those portions of the grid structure enclosed by the grid complement. The grid complement, for example, when in the form of a molded body, may have differing portions which may be fitted to the grid design in successive steps making use of suitable jig or holding frame means. The combined grid design and overlying grid complement may be utilized to make positive plates of either tubular or pasted nature in highly desirable assembly modes. The term "chemically inert" as herein used is intended to refer to materials which are not acted upon or reactive to a substantial degree in the environment present in a lead-acid battery.

One preferred form of the grid complement, where the plate means is a positive plate, may further include a means whereby the diffusion path for sulfate ions to contact portions of the grid structure is lengthened thus reducing the electrical potential at said points. However, sulfate ions will be available in some degree at these points and thus the formation of soluble lead hydroxide is inhibited.

Where it is desired to provide a negative grid structure having an antimony content, the surface contamination of the negative active material may be substantially inhibited by the combination of a grid complement member with a negative grid structure which is of a similar configuration to the positive plate grid diclosed.

BRIEF DESCRIPTION OF THE DRAWINGS

FIG. 2 is a detail elevational view of grid structure of the invention.

FIG. 3 is an end elevational view of the grid structure of FIG. 2.

FIG. 4 is a perspective view of a grid complement member of the invention.

FIG. 5 is a side elevational view of the grid enclosure of FIG. 4.

FIG. 6 is a cross sectional view of a lead-acid storage battery showing details of a tubular type positive plate means of the invention including a newly designed grid structure and grid complement therefor.

FIG. 7 is a cross sectional view taken on the line 7—7 of FIG. 6.

FIG. 8 is a cross sectional view taken on the line 8—8 of FIG. 7.

FIG. 8A is a cross sectional view taken at the line 8A—8A of FIG. 6.

FIG. 9 is an exploded view of the positive plate means shown in FIG. 6.

FIG. 9A is a fragmentary perspective view of a portion of the bottom bar of FIG. 9 prior to being compressed.

FIG. 9B is a detail cross-sectional view illustrating diagrammatically the formation of various chemical compounds on grid surfaces.

FIG. 10A is a diagrammatic view of portions of the grid structure and grid complement of FIG. 6 with the electrolyte indicated in broken lines and futher indicating diagrammatically migration of antimony.

FIG. 10B is a diagrammatic view illustrating conventional grid structure generally corresponding to that illustrated in FIG. 10A.

FIG. 11A is a diagrammatic view of a grid structure in an electrolyte and showing a lengthened path of travel of sulfate ion movement towards the grid structure.

FIG. 11B is a diagrammatic view illustrating a conventional grid structure and similar movement of sulfate ions with respect thereto.

FIG. 12 is an elevational view of the grid complement of FIGS. 4, 5 and 9 illustrated prior to being compressed and showing closure means at one end thereof.

FIG. 12A is an isometric view and partial cross section of the grid complement of FIG. 12.

FIG. 13 is a cross section taken on line 13—13 of FIG. 12.

FIG. 14 is a bottom plan view of the grid complement of FIG. 12.

FIG. 15 is a perspective view of a modified form of a grid complement.

FIG. 16 is a bottom plan view of the grid complement of FIG. 15.

FIG. 17 is an end elevational view.

FIG. 18 is a side elevation of another modification of grid complement.

FIG. 19 is a bottom plan view of the modification shown in FIG. 18.

FIGS. 20, 21, 22, 23 and 24 are views illustrating steps in assembling the grid complement of the invention on a grid structure and thereafter attaching tube means for receiving positive active material.

FIG. 25 is a cross section taken on the line 25—25 of FIG. 24.

FIG. 26 is a perspective view illustrating diagrammatically a further step of introducing positive active material in the tube means indicated in FIGS. 22, 23 and 24.

FIG. 27 is a detail perspective view of an improved bottom bar insert structure shown prior to being compressed for insertion in the tube means of FIG. 26.

FIG. 27A is a detail plan view of one part of the insert structure of FIG. 27 in a compressed and slightly deformed position for facilitating insertion in a respective tube end.

FIG. 28 is an end elevational view of the insert part of FIG. 27A in the position it assumes after being compressed and inserted in a tube member.

FIG. 29 is an elevational view of the grid and tube assembly of FIG. 26 in an inverted position and illustrating partly in cross section one of the tubes with bottom bar insert means secured therein.

FIG. 30 is a cross sectional taken on the line 30—30 of FIG. 29.

FIGS. 30A, 30B, 30C, 30D, 30E, 30F are views illustrating modifications of a grid structure, grid complement and tube means assembly of FIG. 9.

FIG. 31A is a diagrammatic view illustrating electrochemical formation of the positive plate of the invention combined with a negative plate in an acid bath and received in a common container.

FIG. 31B is a similar diagrammatic view but showing conventional positive plate means.

FIG. 38 is an exploded view illustrating in perspective a composite grid complement structure including a top grid component in separate relationship.

FIG. 39 is a view taken substantially on the line 39—39 of FIG. 38 and illustrates the upper grid complement part attached to the lower tube fitting component and engaged in tube top means.

FIG. 40 is an elevational view further illustrating details of the grid complement of FIG. 39 detailed from the tube fitting means.

FIG. 41 is a bottom plan view of the grid complement of FIG. 40.

FIG. 42 is an elevational view of the tube fitting means of FIGS. 38 and 39 shown detached from the tube and grid complement components.

FIG. 43 is a bottom elevational view of the structure of FIG. 42.

FIG. 44 is an elevation view of a tubular type plate showing in partial cross section a composite grid complement structure including a coated part attached to a tube fitting component.

FIG. 45 is a detail cross-sectional view of a grid structure having another modification of coated grid complement.

FIG. 46 is a side elevational view of modified tube fitting means with which the grid and grid complement means of either FIG. 44 or 45 may be combined.

FIG. 47 is a bottom plan view of the fitting means of FIG. 46.

FIG. 48 is a side elevational view of the positive plate means of FIG. 44.

FIG. 48A is a cross section taken on the line 48A—48A of FIG. 48.

FIG. 49 is an elevational view partly in cross section illustrating another modification of composite grid complement means of the invention in which an upper grid component is combined with a frame component of chemically inert material for use in a pasted type of plate structure.

FIG. 50 is a detail perspective view of the upper component of the composite grid structure indicated in FIG. 49 and showing this component prior to being compressed and combined with the lower component of the composite grid complement structure of FIG. 49.

FIG. 50A is a cross section taken on the line 50A—50A of FIG. 49.

FIG. 51 is a perspective view of the lower component of the composite grid complement structure of FIG. 49 shown detached from the upper component of FIG. 50.

FIGS. 52, 53, 54 and 55 illustrate steps in the assembly of some of the components of the pasted plate of FIG. 48.

FIG. 56 is a cross section taken on the line 56—56 of FIG. 55.

FIG. 57 is an exploded perspective view illustrating a grid structure and composite grid complement means including an upper coating component and a lower frame component.

FIG. 58 is a vertical cross sectional view showing the and composite grid complement means assembled together.

FIG. 59 is a detail elevational view partly in cross section further illustrating the grid and composite grid complement assembly of FIG. 58 having an adhesive body applied thereto.

FIG. 60 is a perspective view of another modification of composite grid complement structure.

FIGS. 61, 62 and 63 illustrate steps in assembling a grid structure with the grid complement and frame structure of FIG. 60.

FIG. 63A is a perspective view illustrating the grid complement means of FIG. 60 having formed integrally therewith a retainer for active material on one side.

FIG. 64 is a perspective view of another modified form of a composite grid complement structure.

FIG. 65 is a bottom plan view of a structure of FIG. 64.

FIGS. 66, 67 and 68 illustrate steps in assembling a grid with the composite grid complement structure of FIGS. 64 and 65.

FIG. 69 is a perspective view illustrating one component of another modified composite grid complement structure.

FIG. 70 illustrates the component of FIG. 69 having a grid located therein.

FIG. 71 illustrates the grid and component assembly of FIG. 70 with the top bar and post of the grid having been coated to provide a second component of a composite grid complement.

FIGS. 73–76A illustrate further modification of the invention in which an active material reinforcing network is employed.

DETAILED DESCRIPTION OF THE INVENTION

The lead-acid battery construction of the invention in general comprises improved plate means of either positive or negative type. However, while not limited thereto, the invention is especially concerned with provision of improved positive plate means having grid structures protectively reinforced by grid complement means of the invention and the disclosure noted below is directed in particular to the design and operation of improved positive plate means.

The improved plate means includes a newly designed grid structure and grid complement means of several different types. The grid complement means may occur in the form of one or more enclosure bodies of a chemically inert material which is impermeable to lead-acid battery electrolyte and which may be selectively arranged about portions of grid structures to protectively reinforce same and cover surfaces not in contact with the electrolyte.

In one desirable form the grid complement is designed to be engageable within retaining means for active material. In the case of the retaining means consisting of tubes in which active material is contained the grid complement means may consist of a unitary molded plastic part having insert portions which are engageable within the tops of the tubular retaining means. The grid complement means may also include a composite grid complement structure consisting of separately formed grid complement components also engageable in the tops of tubular type plates. In addition, the composite grid complement structure may be engageable in retaining means for receiving a pasted material and the retaining means may constitute a part of the composite grid complement structure.

In the case of a tubular type plate there may also be provided an improved bottom structure consisting of unique insert means engageable in the bottom of tubes in which active material is contained.

Figure 1:
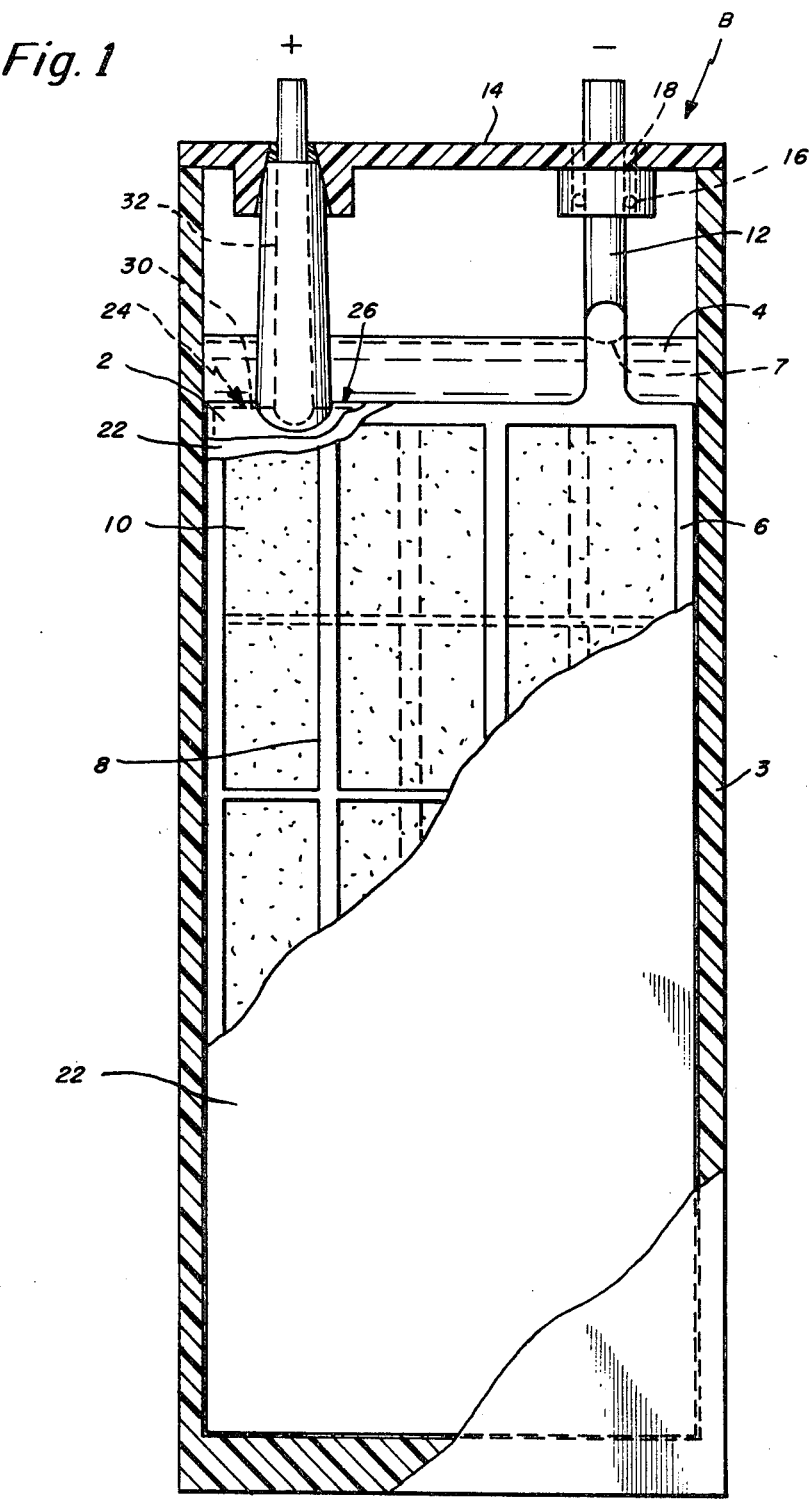
FIG. 1 is an elevational view partly in cross section illustrating one cell of a lead-acid storage battery which includes a positive plate having a grid complement attached thereto in combination with negative plate means, separator means and electrolyte.

Referring in more detail to the drawing, there has been illustrated in FIG. 1 one cell of a lead-acid battery denoted by arrow B. In this cell, negative plate means, separator means and the positive plate means of the invention have been illustrated. The positive plate means is of the tubular type but is intended to be illustrative of installing positive plate means of the invention of either a tubular type or a pasted type. FIG. 1 is also intended to be illustrative of the improved plate means of the invention in either tubular or pasted form wherein the grid structure of the improved plate means is characterized by being free of or having a very low antimony content.

As shown in FIG. 1, battery B includes a container or jar 3 in which is received an electrolyte 4. Immersed in the electrolyte 4 are negative plates 6 interconnected by bridge means 7, each plate having negative grid means 8 around which is a negative active material indicated by numeral 10. A negative post or lug 12 extends through a cell cover 14 being sealed by O-ring 16 and epoxy resin 18 in a conventional manner. Also immersed in the electrolyte 4 are separator means 22 and improved positive plate means 2. As shown in FIG. 1, the positive plate means 2 includes the grid complement of the invention denoted by arrow 26 and newly designed grid structure shown in dotted lines and generally denoted by arrow 24. Grid structure 24 as noted above has no antimony content and in FIGS. 2 and 3 is shown removed from the battery B. In FIGS. 4 and 5, the grid complement 26 is shown also removed from the battery B.

The grid structure 24 is formed of a lead alloy which may be cast while in a molten state in the usual manner and includes a current carrying body commonly referred to as a top bar 30. Projecting from the top bar 30 is post means 32 which may also serve as a burning lug for interconnecting a plurality of plates where two or more plates are to be received in a common cell. The term "post means" as hereafter used is intended to refer to either a post or burning lug. Extending outwardly from the top bar in spaced apart relation are a plurality of current carrying spines 29.

As compared to the top bar and spines of a conventional grid structure employed in a tubular plate, the top bar 30 for reasons to be disclosed may have a cross-sectional area that is somewhat less than that of a conventional top bar. Likewise, the spines 29 are materially modified in structure so that their upper portions 29a at points of junction with the top bar 30 are designed of cross-sectional areas substantially smaller than the cross-sectional areas of tubes in a conventional plate. It will be understood that the cross-sectional area of tubes of any tubular type plate normally have a capacity capable of containing adequate amounts of active material in order to provide satisfactory battery operation and life. Heretofore, upper ends of conventionally formed spines have been enlarged to a cross-sectional area and configuration approximately equivalent to that of conventional tube tops in order that upper ends of these tubes may be fitted snugly around these enlarged upper portions of the spines. It is pointed out that with this new grid design described substantial reduction in weight and material cost may be realized. Also, with the grid 24 having little or no antimony content, it tends to be lacking in strength, and the grid complement 26 shown in FIGS. 4 and 5 constitutes a reinforcing body which strengthens the grid at some points in a desirable manner.

The top bar and upper portions of the spines are vulnerable at certain points to corrosion and the grid complement 26 also provides a means whereby corrosion may be inhibited and as a result grid sections at the top bar and jointing spine parts may have a cross sectional area smaller than that of similar conventional grid portions.

Grid complement 26 in one desirable form is preferably molded in one piece from a resilient plastic material such as a compound of the polyolefin family and is designed to constitute an enclosure body which is chemically inert and impermeable to battery electrolyte. This enclosure body is designed to be located over the grid structure 24 of FIGS. 2 and 3 so as to fit tightly around the top bar 30, the post means 32 and newly designed upper portions 29a of the spines 29 of the reduced cross-sectional area disclosed. In some instances it may be desirable to apply a thin coating or film of adhesive or filler material to the grid structure or to inner surfaces of the enclosure body prior to being located over the grid structure. It will also be understood that other suitable compounds such as compounds of the polyurethane, epoxy resin or rubber families may be used to form the enclosure body. As noted above a desirable resistance to bending or other deformation may be induced in certain portions of the grid by means of the enclosure body. It is intended that the negative plate 6 (FIG. 1) may be similarly constructed.

Principal parts of the grid complement 26 include an elongated top bar enclosure denoted by numeral 36, and a sleeve portion 37 in which the post means 32 shown in FIG. 2 may be received. The grid complement in the form noted in FIGS. 4 and 5 also includes integrally formed insert portions as 39, 41, and 43 which may be arranged around upper portions as 29a of spines as 29 in positions suitable for engaging within and securing tubular elements of the plate in an improved manner.

In FIG. 6 there is illustrated a battery B1 which includes positive plate means of the invention having a grid structure and grid complement means similar to those illustrated in FIGS. 1-5. Also shown are tubes and active material commonly utilized in a tubular type positive plate member. In this tubular type positive plate member, there is further included improved bottom bar means for engging in the lower ends of respective tubes.

It is intended that FIG. 6 be illustrative of plate means having a positive grid structure which, unlike the grid structure of FIG. 1, does have an antimony content in an appreciable amount capable of being released from the grid surfaces to thereafter migrate through the electrolyte body as earlier disclosed. FIG. 6 also illustrates grid complement means for inhibiting such release of antimony from some portions of the grid structure.

As shown in FIG. 6, the battery B1 has a container or jar 31 in which is received an electrolyte body 33. Immersed in the electrolyte body 33 are positive plate means of the invention indicated by arrow 34 and negative plate means denoted by numeral 36a.

At its upper side, battery B1 is closed by a cell cover 38 through which extends negative post means 40 received in a depending part 42 and sealed by an O-ring 44 together with a layer of sealing compound such as epoxy resin 46. A bridge portion 48 interconnects a plurality of negative plates with the negative post means 40.

Components of the positive plate means 34 are indicated at the left-hand side of battery B1 as shown in FIG. 6. Parts of battery B1 as noted in FIG. 6 have been broken away at the left-hand side thereof to more clearly show the components of the positive plate means 34. These components include the newly designed grid structure, the grid complement means of a chemically inert nature, tubes having active material contained therein around the grid spines and improves bottom bar means. In FIG. 7 these components are also shown assembled and on a somewhat larger scale, but removed from battery B1. In FIG. 9 the components appear in separated relationship and FIGS. 8-14 inclusive also show further details of construction of some of the components.

Attention is first directed to FIG. 9 in which are shown conventional type tubes T1, T2, T3, T4, T5 and T6. These tubes may be made of various materials such as woven glass fibers and may include a perforated outer jacket of some suitable plastic material such as polyvinyl chloride. The tubes may be of some suitable shape such as the rectilinear cross-sectional shape shown in FIG. 9. Contained in the tubes are quantities of positive active material indicated by reference characters M1, M2, M3, M4, M5 and M6. Other invention components illustrated in FIG. 9 include the grid structure indicated generally by arrow 62, the grid complement means denoted by arrow 60, and the bottom bar means denoted by arrow 61.

As shown in FIG. 9 and also in FIGS. 6 and 7, the newly designed grid structure 62 is formed from a lead alloy having an antimony content and provides a top bar 50, post means 52, and spaced apart spines 53, 54, 55, 56, 57 and 58. It will be understood that the top bar 50 as shown may have a cross-sectional configuration which differs from that of FIG. 9. It is pointed out that portions of the spines which join with the underside of the top bar indicated at 53a, 54a, 55a, 56a, 57a and 58a are of a cross-sectional area similar to that of the remainder of the spines and that the joining portions cooperate with specially designed portions of the grid complement means to provide for tightly covering the top bar surface while also cooperating with insert portions of the grid complement means to secure tubes in an improved manner so as to define spaces where additional positive active material may be contained as shown at M1' in FIG. 7.

As earlier noted the grid complement 60 has been designed to mate with and surround portions of the grid structure 62. FIGS. 6 and 7 illustrate the grid complement 60 occurring as an enclosure body of chemically inert material selectively arranged about portions of grid 62 to protectively reinforce the grid and to inhibit migration of antimony from grid surfaces which are not in contact with active material.

The grid complement 60 in one desirable form comprises a resilient body which is uniquely fabricated with cooperating parts hereinafter described in more detail. This resilient body is preferably arranged in compressed relationship about the grid structure 62 and in general provides a top bar enclosure body denoted by arrow 61*a* in FIG. 7, a sleeve portion 64 through which post means 52 may be received, and a plurality of tube insert elements denoted in FIG. 9 by arrows 66, 67, 68, 70, 72 and 74. These tube inserts are designed to be engaged in a compressed state against inner top surfaces of respective tubes T1, T2, T3, T4, T5 and T6 so that the tubes are held in secured relationship with respect to the grid structure and the tube walls are maintained in tension.

Securing the tubes by means of compressed insert elements constitutes an important feature of the invention and is accomplished by providing a grid complement of unique insert construction. In FIGS. 6, 7, 8 and 8A the tube inserts are shown in the compressed position they normally assume when engaged against inner surfaces of respective tubes.

In FIGS. 9, 12, 12A, 13 and 14, the grid complement 60 is illustrated in the form of a molded plastic piece as it occurs prior to being compressively engaged around the grid structure 62. In these Figures cooperating parts of the grid complement for forming top bar, spine, and post enclosure means, as well as the tube inserts, are shown in more detail.

As will be observed from an inspection of FIGS. 12, 12A, 13 and 14, the enclosure body 61*a* is formed with spaced apart diverging walls 62*a* and 62*b* which are resiliently joined together at 62'. The diverging walls 62*a* and 62*b* are further formed with relatively thin flexible web portions 62*c* and 62*d* which extend in substantially parallel spaced relation to one another as shown in FIG. 12A. These flexible web portions have supported therealong enclosure parts 62*k* and 62*m* for engaging around the top bar the grid and also around the upper portions of the spines at their points of juncture with the top bar. The enclosure parts 62*k* and 62*m* present respective edges as 62*e* and 62*f* as shown in FIG. 14, and in FIG. 7 the edges are indicated in abutting relation.

The edges 62*e* and 62*f*, at intervals therealong, are formed with recesses as 62*g*, 62*h*, which are designed to surround the mate with the spine portions at 53*a*, 54*a*, which are shown in FIG. 9. The edges 62*e* and 62*f* are shown in more detail in FIGS. 13 and 14 and, when in abutting relation as shown in FIG. 7, cover all of the top bar 50 (FIG. 9) except its opposite ends. The top bar ends may be covered by means of end wall means as 62*j* as shown in FIG. 12.

The flexible web portions 62*c* and 62*d* have extending outwardly in angularly disposed relationship therefrom opposite outer insert sides 80, 82, 84, 86, 88, 90 and 92, 94, 96, 98, 100, 102. These insert sides are illustrated in FIG. 14 and in part are indicated in FIGS. 9 and 12A.

In FIG. 14 there are also shown inner insert sides which project from the outer insert sides and from enclosure parts 62*k* and 62*m* and which present edges of a size and shape such that, when opposite outer insert sides are moved toward one another, the edges 62*e* and 62*f* and the edges of the inner insert sides meet one another and, in combination with the abutting enclosure parts 62*k* and 62*m*, define partially enclosed spaces occurring around the spine portions 53*a*, 54*a*, 55*a*, 56*a*, 57*a* and 58*a*.

Also shown in FIG. 14 are spine engaging rib portions indicated by numerals 80*c*, 82*c*, 84*c*, 86*c*, 88*c*, 90*c*, 92*c*, 94*c*, 96*c*, 98*c*, 100*c*, and 102*c* projecting from respective outer insert sides. These rib portions are shaped to compressively fit against respective spine surfaces when the several insert sides are brought together in an operative position. It may also be desired to form along the outer insert sides barbs as, for example, is shown in FIG. 9 at 109, 111, 113, 115, 117 and 119. The barbs may be V-shaped to present means for engaging and displacing outwardly contacted portions of respective tube tops as shown, for example, in FIG. 7, and which, in combination with the spine engaging rib portions, insure a tighter engagement between the grid complement and respective tubes.

It is pointed out that the cooperating parts of the resilient grid complement means, when compressibly located around the top bar and with the inserts in the tubes as disclosed, cover and tightly engage against all surfaces of the grid structure which are not in contact with positive active material and constitute a barrier which is found to be capable of substantially inhibiting release of antimony from the grid structure into the electrolyte body.

It may also be desired to provide, in place of conventional bottom bar means employed with tubes, improved bottom bar means 61 earlier noted. The improved bottom bar means 61 in one desirable form is shown in FIG. 9, and includes a plurality of interconnected bottom bar inserts generally indicated by arrows 110*a*, 112*a*, 114*a*, 116*a*, 118*a* and 120*a*. These bottom bar inserts are of a construction somewhat resembling that of the top bar inserts earlier described and are designed to fit snugly within respective bottoms of tubes T1, T2, T3, T4, T5 and T6 as illustrated in FIGS. 6 and 9. Included in the bottom bar means 61 is a bottom side 110 designed to be supported in the battery case 31 as illustrated in FIG. 6. As shown in FIG. 9A each bottom insert includes spaced apart vertical walls as 122*a* and 124*a* and intervening vertical walls as 110*d* and 110*c*. These vertical walls define spaces in which active material is received and the electrolyte communicates with the active material through tube walls as T1 and also through perforation as 113*a* and 113*b* in certain of the insert walls as is shown in FIGS. 7 and 9. It will be observed that the improved bottom bar disclosure provides for utilization of larger quantities of positive active material as compared to quantities employed in a conventional bottom bar structure for a positive plate wherein the lower ends of the spines are ordinarily received directly in the bottom bar in an opening formed therein. In thus providing bottom bar insert means engaging only with lower ends of tubes, an additional advantage is realized in assembling the components as will be later disclosed.

A desirable feature in the construction of these bottom bar insert parts is the provision in the intervening vertical wall portions 110*c* and 110*d* of V-shaped notches as 110*f* and 110*g* indicated in FIG. 9. These notches are useful in temporarily deforming the walls 110*d* and 110*c* slightly inwardly during assembly as shown in FIG. 27A. A further feature is the provision in the vertical walls as 122*a* of resilient rib means indicated at 122*b* and 122*c* which are designed to interlock as shown in FIGS. 27A and 30 and which limit inward bending as well as inducing return of walls 110c, 110d to a normal straightened position. Bending the walls facilitates entering the inserts in respective tube bottoms, insures rapid assembly of all of the inserts simultaneously and eliminates bending of spines induced by the installation of conventional bottom bar means. There may also be provided on the vertical walls, as 122a and 124a, bars as 110i (FIG. 9) which are similar to those illustrated in the top bar inserts and which function in a somewhat similar manner to more firmly secure the tubes in fixed relationship to the bottom bar means. It is contemplated that the bottom bar means 61 of FIG. 9 may be formed of a material which is not impermeable to electrolyte in order to further facilitate communication between the electrolyte body and adhesive material.

The battery B1 (FIG. 6), when placed into operation involving chemical energy being converted into electrical energy in accordance with the well-known double-sulfate reactions at the positive and negative plate means, is characterized by an improved method of lead-acid battery operation. In this improved method it will be noted that all surfaces of the positive grid which are not covered by the active material are provided with barrier means which prevents contact of the electrolyte with these surfaces and prevents release of antimony therefrom. Concurrently antimony present in the spines is released to the active material where it is absorbed, thereby greatly improving the cohesion of the positive active material and its contact with the spines. There is thus realized the desirable result of long-operating life particularly under deep discharge conditions in a battery that requires little or no maintenance and battery B1 has a substantially constant charging characteristic and low self-discharge characteristic during its entire life.

FIG. 10B illustrates diagrammatically the manner in which antimony in a conventional positive tubular plate tends to migrate from grid surfaces through an electrolyte body 140 to the active material of a negative plate (not shown). The grid structure of this conventional positive plate includes a top bar 130, post means 132 and spine means 134. Tube means 136 maintains a positive active material 138 in contact with the spine means 134.

Antimony released from the surface of spine means 134 in the electrolyte is indicated by small arrows a1, a2, a3 and, as shown, contacts the positive active material and is contained within the active material in the space defined by the tube means 136 provided that the antimony at the surfaces of spine means 134 is not of sufficient quantity to saturate the active material in the space defined by the tube means 136 during the expected life of the battery. However, surfaces of the top bar 130 and post means 132 which are not in contact with positive active material release antimony as indicated by large arrows as A1, A2, A3, and it is this released antimony which migrates through the electrolyte body 140 and contaminates the negative active material of the battery to cause battery failure, increased maintenance, increased self-discharge, change in charging characteristic and shortened operating life.

FIG. 10A illustrates comparatively the positive plate means of the invention which includes a grid top bar 142, post means 144 and spine means 146 in an electrolyte body 160. Positive active material 148 is held around spine means 146 in tube means 150. Numeral 152 denotes the top bar enclosure portion of a grid complement which also includes a tube insert means 154 and post sleeve means 156. Antimony released from the spine means 146 is indicated by small arrows as a4, a5, a6, and, as shown, is contained by the active material 148 which is materially improved as previously disclosed. It will be noted that additional quantities of active material are received within the insert means 154 which is obviously advantageous.

Large arrows as A4, A5, A6 in broken lines suggest inhibition of release of antimony from top bar means 142 and post means 144 by grid complement parts 152 and 156. It will be apparent that all surfaces of the grid structure which are not covered with active material are being maintained out of contact with the electrolyte 160 to constitute an improved step in lead-acid battery operation.

It will also be observed that, in addition to preventing antimony contamination of negative active material, the release of poisonous stibine gas may be inhibited since no antimony bearing surface is in direct contact with the electrolyte.

Operation of a normal lead-acid battery may be considered to take place according to the well-known double-sulfate reaction, $$PbO_2 + Pb + 2H_2SO_4 \rightleftharpoons 2PbSO_4 + 2H_2O \qquad (1)$$

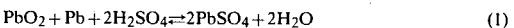

where this equation represents discharge when read from left to right and charge when read from right to left.

Pure lead surfaces such as may be present in a positive grid structure may, upon discharge, become sulfated with an emission of hydrogen according to the following reaction $$Pb + H_2SO_4 \rightarrow PbSO_4 + H_2 \qquad (2)$$

Upon recharging the $PbSO_4$ on the grid surfaces will be transformed into $PbO_2$ and Pb as expressed in the equation (1) above noted.

However, should there be an insufficiency of sulfate ions present in the electrolyte around some portions of the grid structure during discharge, some of the $PbO_2$ present at these portions of the grid surface will not be transformed into $PbSO_4$, but rather into $Pb(OH)_4$, according to equation $$PbO_2 + 2H_2O \rightarrow Pb(OH)_4 \qquad (3)$$

Further reduction of the tetravalent Pb into a bivalent state will reduce the $Pb(OH)_4$ to $Pb(OH)_2$ which will be soluble in the electrolyte. When this $Pb(OH)_2$ dissolves, a clean lead surface is exposed which will, upon recharge, revert to $PbO_2$ and again take part in the reaction previously noted in equation (1).

Sulfate ion insufficiency is most likely to occur during deep discharge since the sulfate ions are utilized in transforming the active $PbO_2$ into $PbSO_4$. Thus the specific gravity of the electrolyte will approach that of water, and under this condition $Pb(OH)_4$ and subsequently, $Pb(OH)_2$ will be formed.

The foregoing will continue as the battery is cycled with the grid structure gradually corroding into $Pb(OH)_2$ and dissolving into the electrolyte.

It will be noted that the specific gravity of the electrolyte will become closest to that of water around those portions of the positive plate where the electrochemical activity has been greatest, that is, at the uppermost portions of the spines. Here the path of current flow between the positive and negative plates is shortest and therefore the current density is highest. This, of course, is at "inside corners" of the grid structure, that is, at the junctions between the spines and the top bar, where stresses formed internally of the grid structure during molding or casting are at a maximum.

In addition, should conditions arise such that a Pb surface is in direct contact with a $PbO_2$ surface in the presence of water, a miniature short-circuited "battery", having Pb as its negative electrode, $PbO_2$ as its positive electrode, and $H_2O$ as its electrolyte, will result. Under these conditions since no sulfate ions will be present, the Pb electrode will be entirely consumed by the formation of $Pb(OH)_2$. However, if sulfate ions are made available, $PbSO_4$ will be formed over the Pb surface which will stop these reactions.

For these reasons it is most desirable to:

(1) protect all exposed surfaces of the grid fully from contact with the electrolyte so that they cannot enter into charge-discharge reactions, and (2) reduce the current density at the junction points between the top bar and spines to such a degree that the double-sulfate reactions at these points are substantially inhibited, and (3) to insure the presence of a quantity of sulfate ions at these points of the grid structure sufficient to replace those sulfate ions used up by the double-sulfate reactions, thereby maintaining the specific gravity at a Ph sufficient to preclude the formation of $Pb(OH)_4$ and subsequent $Pb(OH)_2$ at the aforementioned vulnerable junction points.

FIG. 11B illustrates diagrammatically typical grid corrosion areas in a conventional tubular plate including the surface 164 of grid post means 166, the surface 168 of grid top bar 170, and the surface 172 of spine means 174. Arrows as A7, A8, A9 indicate diagrammatically ion diffusion and thus current flow, the flow arrows A7 and A8 are directed especially to grid areas particularly vulnerable to previously disclosed corrosion processes at points where the spine means 174 joins the top bar means 170. Arrow 9 indicates another vulnerable point where the post means 166 joins the top bar means 170.

In FIG. 11A, there is illustrated diagrammatically positive grid means of the invention in which occur top bar means 178, post means 180 and spine means 182. It will be seen that the grid complement member 184 overlies and protects all surfaces of the post means and top bar means against contact with the electrolyte body and thereby blocks flow of current as indicated by broken arrows A14 and A16. Also, by means of the depending insert means 186, movement of sulfate ions to the surface of spine means 182 is diverted along lengthened paths of travel as indicated by the curved arrows A10, A11, A12.

Since current density during discharge is dependent upon availability of sulfate ions the relatively longer paths indicated by A10, A11 and A12 will produce a reduced current density at these points. However sulfate ions will be available at these points and thus corrosion will be lessened.

Figure 11C:
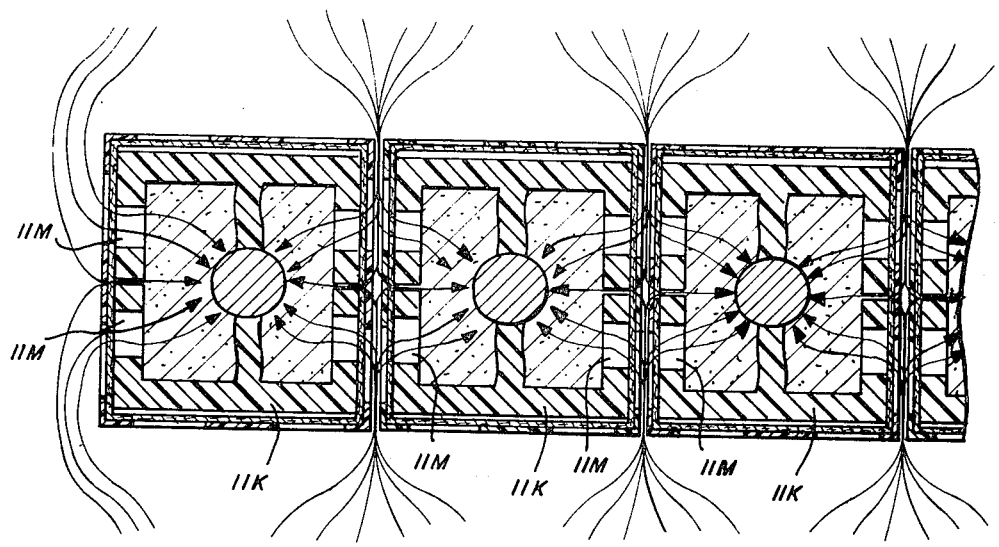
FIG. 11C is a cross-sectional view taken on the lines 11C—11C of FIG. 11A.
Figure 11D:
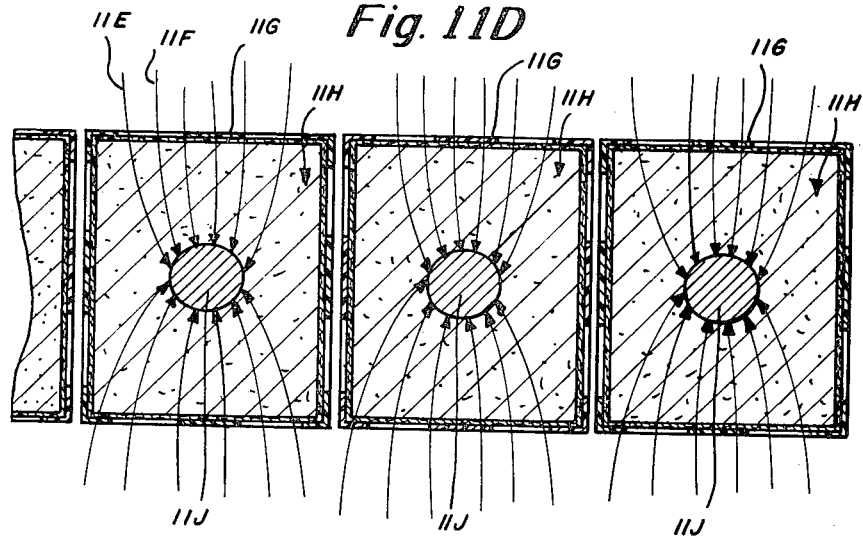
FIG. 11D is a cross-sectional view taken on the line 11D—11D of FIG. 11B.

FIG. 11C is a cross section taken on the line 11C—11C of FIG. 11A, FIG. 11D is a cross section on the line 11D—11D of FIG. 11B. These Figures illustrate diagrammatically the current flow in a different plane.

FIG. 11D illustrates a conventional battery in which sulfate ion diffusion and thus current flow is indicated by arrows as 11E, 11F. Current flows directly through the tube walls as 11G and the active material as 11H to spines as 11J.

FIG. 11C illustrates a positive plate means of the invention in which a grid complement 11K is provided with openings as 11M through which a limited sulfate ion diffusion, and thus current flow, takes place along a lengthened path. Again current density is reduced, corrosion of spine surfaces is materially lessened and increased spine life is realized.

The grid complement means illustrated in FIGS. 1–14 inclusive embodies the concept of utilizing an enclosure body of a chemically inert material occurring as a molded plastic part to protectively reinforce grid structures of a tubular type plate. FIGS. 6–14 illustrate a grid structure of a tubular type plate whose lead alloy has an antimony content and embodies the concept of utilizing a grid complement means to inhibit release of antimony. FIGS. 1–14 further embody the concept of utilizing grid complement means to reduce corrosion at certain points of the grid structure of tubular type plate.

Grid complement means of the same general nature may, in accordance with the invention, be structurally modified in various ways as suggested in FIGS. 15–19 inclusive; may be employed to carry out improved methods of making and assembling positive and negative plate means of a tubular type as illustrated in FIGS. 20–33 inclusive; may be desirably combined with other grid complement parts to form composite grid complement means for plate means of tubular type as shown in FIGS. 38–48 inclusive; and may further be combined with other grid complement parts to form composite grid complement means for use in making pasted-type plates in several different forms as shown in FIGS. 49–76A.

In reference to the structurally modified forms of grid complement means illustrated in FIGS. 15–19, it should be understood that it is customary in making some plates of the tubular type to utilize tubes of a cross section and shape differing from that illustrated in FIG. 9. For example, the tubes may be of cylindrical shape and, in such case, the grid complement means may be modified to provide insert means of a shape suitable for fitting within the cylindrical inner surfaces of the tubes. As shown in FIGS. 15 and 16 a grid complement member generally denoted by arrow 192 includes a top bar enclosure part 194, a sleeve 196 and a plurality of insert elements supported at the lower side of 194 and denoted by numerals as 198, 200. These insert elements are of a semi-cylindrical shape and have spine engaging ribs as 202, 204. When the semi-cylindrical portions are brought together they form cylindrically shaped inserts which are engageable in cylindrical tubes as noted above.

It may also be desired to form the grid complement sleeve 196 with a tapered shoulder 196a which has a cylindrically shaped extension 196b of reduced diameter. Such a sleeve shape may be advantageously employed in other ways as later disclosed.

FIG. 18 illustrates a grid complement means generally denoted by arrow 210 which may be employed with tube means designed to enclose a plurality of grid spines rather than a single spine. Numeral 212 denotes a top bar enclosure part having insert portions as 216 and 218 in which are provided ribs as 220, 222. When the insert portions are compressed around a grid structure, its spines are engaged by the ribs in the manner earlier noted. It will be understood that the insert portions are to be received within tube means suitably shaped to mate therewith and arranged to contain active material in the manner already described.

FIGS. 20–25 inclusive illustrate a method, earlier referred to, of assembling the grid complement means of the invention on a grid member. This assembly procedure includes steps forming an important part of an improved method of making positive and negative plate means further illustrated in FIGS. 26–33 inclusive.

Referring in more detail to FIGS. 20–25, there is illustrated a grid structure denoted by arrow 223 of a form similar to that shown in FIG. 9. The grid structure, as is customary in conventional plate making, is molded from a lead alloy to provide post means 226, a top bar 228 and spines as 230 which may have fins as 232. The grid structure may be supported either manually or by mechanical means in a horizontally disposed position as shown in FIG. 20 in juxtaposition to a grid complement member generally denoted by arrow 234. Mechanically supporting the grid structure 223, which may be of a readily deformable nature, may result in less likelihood of bending of grid components. The grid complement member 234 may, for example, be supported on a movable base or table 236 which is arranged in spaced apart relation to jig element 238 adapted to be fixed to a wall or other suitable abutment means.

The jig element 238 may be of metal, plastic or other material and is formed with a cylindrical hole 240 which is of a size suitable for receiving therethrough an end of post means 226 and is also constructed with an annular shoulder 242 against which the end 244 of sleeve 246 may abut.

With the parts arranged as described, the grid structure is advanced, either manually or mechanically, to locate the post means 226 in cylindrical hole 240 of jig part 238 as suggested in FIG. 21 with the end 244 of sleeve 246 of the grid complement abutting against the annular shoulder 242 of jig 238. It may also be desired, prior to advancement of the grid structure, to coat post means 226 and top bar 228 with a cement or packing material or to coat inner surfaces of the grid complement with cement or packing material. During the advancement of post means 226 through sleeve 246, the sleeve becomes longitudinally compressed due to frictional forces thereby enlarging its internal diameter so as to further facilitate progressive advancement of post means 226.

The grid structure continues to advance to a point at which the top bar 228 engages against enclosure means 248. The jig part 238 is then retracted, allowing the sleeve 246 to revert to its normal size and shape, thus insuring a tight fit between itself and the post means.

It will be noted that, at this point of travel of the grid structure, enclosure means 248 has become located between forming jaws 250, 252.

As the grid structure and grid complement are further advanced, these forming jaws 250, 252, engage the insert means 254, 246, forcing them into a position substantially parallel to spine means 230. At a still further point of travel, the forming jaws 250, 252, move toward one another thereby compressing insert means as 254, 256, into the position shown in FIG. 22 in readiness to be inserted in tube means as 259.

The tube means as 259 may be comprised of a set of tubes as shown in FIG. 9 and may be moved either manually or mechanically into a position as shown in FIG. 23. Insert means as 254, 256, will then become inserted within ends of the tube means as 259. FIG. 24 illustrates insert means as 254, 256 in a fully inserted position in tube means 259 and engaged with spine means as 230, and also shows the forming jaws 250, 252 retracted with barbs as 258, 260, pressing outwardly against inner wall surfaces of respective tube means.

FIG. 25 is a partial cross section of the assembly of parts shown in FIG. 24 and illustrates the abutting relationship between spine engaging ribs as 253 and the spines as 230.

FIG. 26 illustrates the further method step of introducing active material into the tube means as 259, shown in an inverted position, with the grid complement means closing one end of each of the tube means to contain active material indicated by arrows as p,q,r.

FIG. 29 illustrates the step of applying a bottom bar structure to the open ends of tubular means as 259. The bottom bar means, generally indicated by the arrow 264 in FIG. 27, is provided as a molded plastic part having foldable insert portions which may be compressed to form the insert portions indicated in FIGS. 9 and 28. Component parts of this molded plastic part 264 are similar in all respects to the component parts of the bottom bar of FIG. 9 already described. In the folded or compressed positions illustrated in FIGS. 9 and 28, the insert portions are next inserted in the tube means 259 as shown in FIG. 29 and further indicated in cross section in FIG. 30. It may be desired to deform wall portions of the bottom bar 264 as shown in FIG. 27A to facilitate engagement of the bottom bar components within the tube means as 259. It will be observed that the bottom bar means disclosed does not engage or support the spines of the grid as is customary with conventional bottom bar means which may result in easier installation and avoidance of possible bending of ends of spines thus engaged. This is accomplished in the same manner as described in reference to FIG. 9 utilizing the V-shaped notches and ribs as shown in FIG. 9. Also the insert walls in the plastic molded part of FIG. 27 disclose in more detail perforations which enable electrolyte to pass through portions of the bottom bar insert means 264 and into contact with additional amounts of active material contained within the spaces defined by the bottom bar insert means and indicated by M1" in FIG. 9.

In carrying out the step of securing top bar and bottom bar insert means in respective tube ends it may also be desired to firmly anchor the insert parts in respective tubes in other ways for example by applying an adhesive to either the insert surface or to the end portions of the tubes.

Alternately a heat deformable material may be applied at the areas noted and thereafter the insert means may be fused to the tube ends by the application of heat.

For example, FIGS. 30A–30C illustrate such a method of securing insert portions of a grid complement in tops of tube members. In this method tube means as 251 may be provided with impregnated portions as 255–257 wherein the impregnating material is capable of flowing or fusing when subjected to heat at suitable temperatures and is compatible from the standpoint of fusion with the material of the grid complement.

As shown in FIG. 30B the grid structure, having a top bar 261 and post means 263, is enclosed by a grid complement member 265 having insert portions as 267. These insert portions, which may be formed with outer holding barbs, are engaged within the impregnated tube ends as 255. Temperatures sufficient to fuse the impregnated material in ends as 255 may be applied by heating elements as 269, 271 (FIG. 30C) and the impregnating material and insert portions will then become fused together to provide for a solidly secured relationship of these parts with respect to one another as shown in FIG. 30C.

FIGS. 30D and 30E show a similar method except that the insert portions are constructed with barbs as 273, 273a. When heat is applied as noted above, the barbs as 273, 273a melt and impregnate the tube wall thereby providing an improved engagement of the grid complement with the tube wall.

FIG. 30F illustrates still another method of joining grid complement means and tube means wherein the insert portions are formed without holding barbs and these parts are joined to one another by the application of a suitable adhesive material 277.

The process steps illustrated in FIGS. 20–30F inclusive provide plate assemblies for making either positive or negative plates which, as is conventionally the practice, require further chemical treatment by well-known techniques. These techniques include sulfation of active material and electrochemical "forming" treatment by means of which an "unformed" plate is initially charged in an acid bath of relatively low specific gravity to provide a "formed" plate. This "formation" turns the active material of a positive plate into $PbO_2$ and the active material of a negative plate into "sponge" lead. In this procedure it is necessary that there be present in the acid bath both positive and negative electrodes, one of which may be a "dummy".

FIG. 31B illustrates diagrammatically a conventional formation treatment carried out in a container 270 in which is received an acid body 272 consisting of relatively low specific gravity sulphuric acid. Numeral 274 denotes an unformed positive plate having a grid structure which has an antimony content. Numeral 276 denotes an unformed negative plate received in the acid body 272. An electrical current then applied will "form" the plates to their proper respective polarities.

However, antimony as indicated diagrammatically by arrows 278, 280 will be released from exposed surfaces of the positive grid structure 275 and will become deposited upon the active material surfaces of negative plate 276, thus causing undesirable changes in the negative plate.

Substitution of a dummy electrode containing no antimony for the positive plate will obviously preclude transfer of antimony and subsequent contamination of the negative active material. This is the conventional practice where a relatively high quality negative plate is desired. However, the dummy positive electrode is rapidly transformed into $PbO_2$, in which state it disintegrates into a sludge. This necessitates relatively frequent cleaning of the container and replacement of the dummy electrode. Also, the positive plate must be formed in a separate container against a dummy negative electrode. Elimination of this antimony contamination by some method will be economically advantageous for the reasons cited. FIG. 31A illustrates diagrammatically such a method.

Numeral 282 denotes a container in which is received an acid body 284. Received within the acid body are positive plate means 286 of the invention, substantially similar to that shown in FIG. 7, also shown is negative plate means 288. Electrochemical formation is carried out in the manner already described except that no antimony is released from the positive grid surfaces to become deposited upon active material of the negative plate 288. Grid complement 283 which overlies the surface of the positive grid functions to inhibit or to substantially reduce release of antimony as suggested by the broken arrows 290 and 292. It will be apparent that all surfaces of the positive grid structure which are not in contact with active material of the positive plate have thus been effectively prevented from coming into contact with the acid body 284 and no transfer of antimony to the negative active material takes place. Therefore, both high quality positive and negative plates may be formed in a common acid bath received in a common container, thus achieving obvious economic advantages.

Reiterating, desirable advantages may result from the common acid bath formation described. As earlier pointed out plates are formed separately, i.e., positive plates in one acid tank and negative plates in another, dummy electrodes must be used and obviously therefore more tanks and charging rectifiers will be required than would be the case where plates are formed together.

Forming plates together may eliminate some of these difficulties although, in some cases, better plates may result from separate formation. However, it is recognized that the greatest reason for separate plate formation may be to prevent antimony contamination of negative active material during formation when the grid structure of the positive plate has an antimony content. It will therefore be appreciated that utilizing a grid complement in the manner above disclosed eliminates or substantially inhibits antimony transfer thus making the formation of positive and negative plates together a practical procedure except in the most exacting cases.

It is well known that the electrochemical formation of any conventional positive plate will produce an oxidation of surfaces of the positive grid structure, and, in the case of the post means resulting in a surface coating of $PbO_2$ which must be removed from those portions of the post means to which an electrical connection is to be made. Removal of this coating of $PbO_2$ is conventionally accomplished by cleaning or brushing of these surfaces which, in turn, may produce an occupational hazard from airborne lead dust or particles. In addition this coating of $PbO_2$, if not removed properly from those portions of the post means which pass through a cell cover, will substantially inhibit satisfactory sealing of the post means in the cover.

Figure 32:
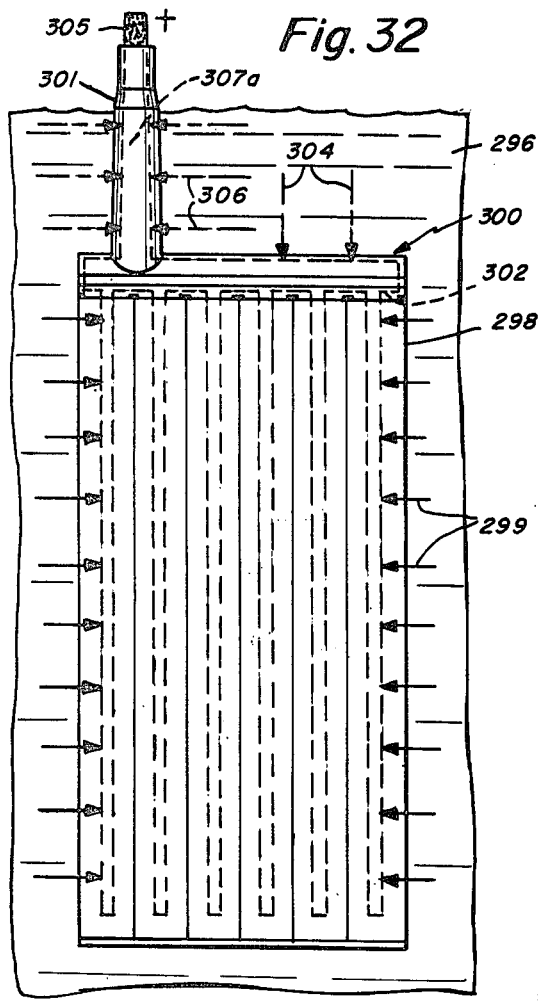
FIG. 32 is another diagrammatic view illustrating a method of inhibiting the formation of Pb02 on some positive grid surfaces during electrochemical formation of the positive plate means.

FIG. 32 illustrates diagrammatically a method whereby the formation of the $PbO_2$ coating on portions of the post means of a positive plate may be substantially inhibited. In FIG. 32, numeral 296 denotes a common acid bath in which are supported positive plate members as 298 and some negative electrodes (not shown). Numeral 300 indicates a grid complement of the invention overlying a positive grid structure 302. Oxidation occurs at surfaces of the spines in the usual manner as indicated by small arrows as 299 but is prevented from occurring at those grid surfaces covered by the grid complement as indicated diagrammatically by the broken arrows 304, 306.

Figure 33:
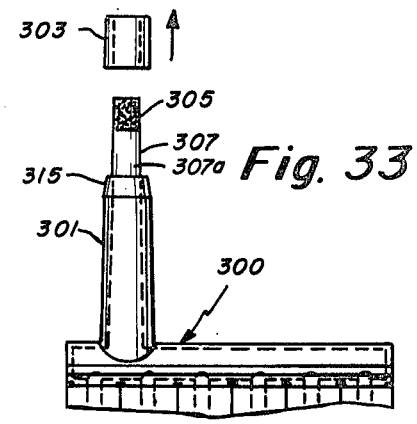
FIG. 33 is a detail elevational view of the grid complement of the invention mounted over a positive grid structure, shown fragmentarily and further illustrating a sleeve portion of the grid complement being removed to expose post means with a clean lead surface.

A further step in the method introduced in FIG. 32 is illustrated in FIG. 33. As will be noted from an inspection of FIG. 32, the grid complement 300 has a sleeve part 301 which protectively encloses lead surfaces of the post means 307a throughout a portion of its length during formation in the acid bath 296 so that $PbO_2$ may only be formed at the surface of the exposed top end 305 as indicated in FIG. 32.

Upon removal of the positive plate from the acid bath 296 and prior to locating this member in a battery cell a portion 303 of the sleeve 301 is, in accordance with the invention, cut away and removed as indicated diagrammatically in FIG. 33. There is then exposed a remaining post part having a clean lead surface as indicated at 307. The upper coated end 305 may be cut off to leave a suitable post terminal surface for making an electrical connection thereto.

Figure 34:
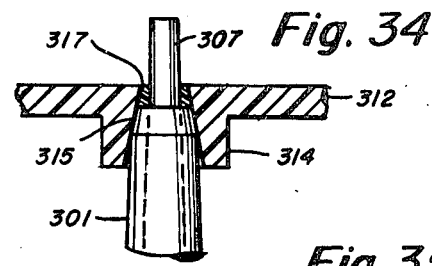
FIG. 34 is a fragmentary cross sectional view of a battery cell cover showing portions of a post member and a grid complement sealably received in the cell cover.

In locating the plate means of the invention in a battery cell there may be utilized a retaining plate or cell cover 312 having depending tubular parts as 314 as shown in FIG. 34. The upper end of the sleeve portion 301 may also have a tapered surface 315 which mates with tapered inner surfaces of depending parts 314 and which may be further sealed by means of an adhesive such as an epoxy resin denoted at 317.

Figure 35:
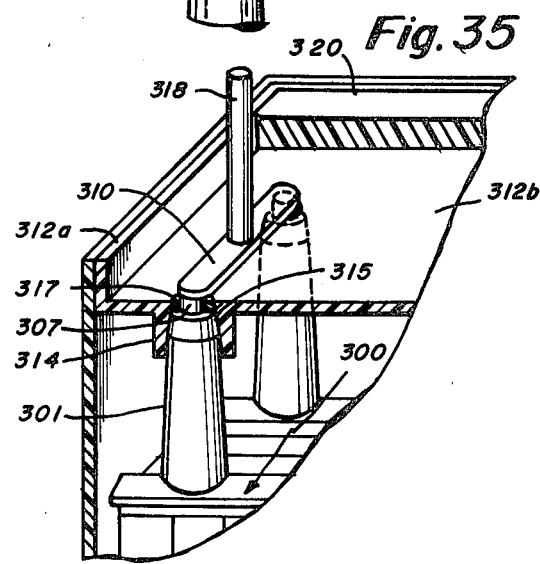
FIG. 35 is a fragmentary perspective view of a battery cell in which are received a plurality of positive plates having cylindrical end means enclosed within the grid complement means of the invention and illustrating the cylindrical end means interconnected by a burning bar or bridge member from which extends a terminal post.

FIG. 35 further illustrates a means whereby a plurality of plate means of the invention may be interconnected. As illustrated in FIG. 35, a retaining plate 312a (corresponding to 312 in FIG. 34) is set into and sealed to a battery jar. In this arrangement the upper surface 312b of the retaining plate lies below a rim of the battery jar and thus provides a space in which may be received an interconnecting strap 310 as well as a layer of epoxy resin or other sealing compound indicated at 320.

The interconnecting strap 310, as seen in FIG. 35, may have a post element 318 which will constitute a battery terminal. The lower end of this post and the strap may be covered with a layer of any suitable sealing compound as indicated at 320. By means of the method disclosed in FIG. 35, antimony transfer from the interconnecting strap as 310 to the negative active material may be eliminated.

Figure 36:
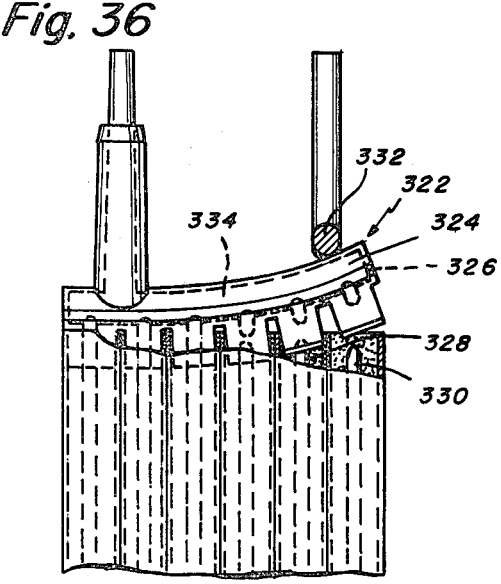
FIG. 36 is a partially cut away view illustrating a top bar of a positive grid structure in a deformed condition such as may be caused by corrosion of the grid and further illustrating the grid complement means in a position to function as an electrical insulating part with respect to a negative bridge structure.
Figure 37:
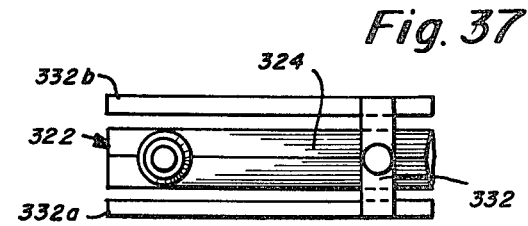
FIG. 37 is a plan view of the structure shown in FIG. 36.

FIGS. 36 and 37 illustrate a positive plate assembly 322 of the invention including a grid, a bent end of which is indicated at 326, and grid complement means 324 wherein the top bar 334 of the grid has, by reason of corrosion, become separated from spine elements 328 and 330 and, further, become bent upwardly as may occur when a tubular type plate approaches the end of its life. Numeral 332 denotes a bridge interconnecting a plurality of negative plates as 332a, 332b (FIG. 37) within the cell cavity. It can be seen that the upward bending of top bar 334 can move it into contact with the bridge 332. In such a situation the grid complement means 324 functions as an electrical insulating barrier located between the top bar 334 and the bridge 332. Short circuiting of the cell and consequent battery failure is thus avoided. This insulating feature is also in effect in the event that the top bar becomes raised by lengthening of the spines which may occur due to corrosion.

FIGS. 38–43 illustrate grid complement means including separately molded plastic pieces of resilient chemically inert material which may be employed to provide an alternate method of protectively enclosing a grid structure as well as engaging within and securing active material retaining means such as the tube elements previously described.

As shown in FIG. 38, arrow 338 indicates generally a molded lead alloy grid structure including a top bar 340 having post means 342 and a plurality of spaced apart spines as 344, 346 depending therefrom. Immediately above the grid structure, as indicated in FIG. 38, is one component part 347 of a composite grid complement means of the invention. This component 347 has a top bar enclosure part 348 for enclosing portions of top bar 340. Numeral 350 denotes a sleeve portion of the component 347 formed with a tapered upper end 352. A second component of the composite grid complement means is indicated generally by arrow 370.

The component 347 of the composite grid complement means is further illustrated in FIGS. 40 and 41 in the form of a molded plastic part as it appears prior to being compressed around the grid structure in the position illustrated in FIGS. 38, 39.

As shown in FIG. 40, the molded plastic part 347 has depending sides as 356 which terminate in abutting edges 358, 360 and, when the depending sides are compressed around the top bar 340 as indicated in FIG. 39, these edges 358 and 360 meet to completely enclose parts of the top bar occurring between the spines as 344, 346. At spaced apart points along the edges 358, 360 are recesses as 362, 364 which are designed to be located around and mate with surfaces of respective spine portions joining with the top bar when edges 358 and 360 are compressed together.

Also provided along opposite lower sides are retainer flanges 366, 368 (FIGS. 38, 39) which provide for engagement of the component 347 with the second component 370 of the composite grid complement means. This second component consists of a molded plastic piece as illustrated in FIGS. 38, 39, 42 and 43 and which comprises a tube fitting member made up of a plurality of tube insert portions as 376 connected together as shown in FIG. 43. Part 370 employed in combination with the component 347 of the composite grid complement means provides an alternate method of securing tube elements around the spines of a grid structure.

As is most clearly shown in FIG. 43, each of the tube insert portions 376 is formed with walls of a shape and size designed to fit snugly inside respective tops of tubes as 380 in spaced relation to respective spines as 344, 346 (FIG. 38). The tube inserts 376 are secured together by a channeled upper portion 382 having spaced apart channels 390, 392 which are engageable with the retainer flanges 366, 368 of the component 347 to secure both components 347 and 370 in interlocked relationship about the grid 338. As shown in FIG. 43, each of the insert portions 376 is formed with a spine aperture as 374 through which spines are received in snugly fitted relationship as indicated in FIG. 39. Opposite lower parts of the insert portions 376 may also be formed with barbs as 378, 379 which function, in the manner already disclosed, to engage inner top surfaces of tube members as 380 shown in FIG. 39.

It will be noted that this composite grid complement means provides an alternative method of assembling a grid structure within tube tops and such a method may be desirable in some instances. The spaces defined by the inserts also provide room for retaining additional active material. In addition, when the plate is a positive plate, corrosion at vulnerable points of the grid structure is inhibited as earlier described.

It may also be seen that some of the insert walls may be formed with V-shaped recesses as 383 to provide for easier deformation of insert portions to facilitate engagement of these inserts within respective tube tops.

FIGS. 44–48A, inclusive, illustrate a modified form of composite grid complement means in which tube fitting means may be combined with a layer or coating of a chemically inert material in place of the component part 347 of FIG. 38.

In accordance with the invention, portions of the grid structure, including the top bar 394, post means 396 and portions of spines as 392 are covered with a layer or coating 398 of a chemically inert material impermeable to electrolyte as noted above. This is illustrated in FIG. 45. The coated grid structure may then be engaged in the tube inserts.

The layer or coating 398 may be applied in various ways as by dipping, brushing, spraying and the like. However, in one preferred method of application, the coating may be applied by electrostatic deposition and it is this formation which has been illustrated diagramatically in FIG. 45. It is known that electrostatically depositing material upon surfaces which are joined together will result in a coating of a greater thickness at inside corners. Advantage is taken of this characteristic to provide the coating 398 with relatively greater thickness as indicated at points 400, 401 in FIG. 45. This relatively greater thickness of coating is located precisely at those points of greatest vulnerability of the grid structure and there is thus obtained a significantly improved protective barrier means.

As shown in FIGS. 46 and 47, the tube fitting means denoted by arrow 384 comprises a plurality of tube inserts as 389 connected together. As indicated in FIG. 44, the inserts may be engageable within tube means as 386 and be secured by barbs as 388 around which the inner sides of the tube means are extended and secured in the manner previously disclosed. A plurality of tubes of substantially square cross-sectional shape are shown in FIG. 48 but are intended to be illustrative as well of tubes of other cross-sectional shapes such as circular and the like. The inserts are of a similar shape as is more clearly shown in FIG. 47 but may be varied in shape in accordance with the tube shape to be fitted. Each of the inserts as 389 are further formed at their tops with tubular depending spine retainer parts 391 made of a size and shape to enclose the coated portions of respective spines as 392.

In FIG. 44 the coated grid with its spines received through the depending parts 391, is shown further sealed by means of an adhesive such as an epoxy resin 402.

FIGS. 48 and 48A show the coated grid combined with the fitting means and other components to constitute a plate member.

FIGS. 49–76A illustrate plates of the pasted or "flat" type as distinguished from the tubular type plates disclosed in FIGS. 1–48A. As shown in FIGS. 49–71, grid structures are combined with grid complement means of the invention in several modified forms to constitute improved pasted plate members.

Attention is directed to one desirable form of pasted plate shown in FIGS. 49–56A. Numeral 404 denotes the top bar of a grid structure of the form earlier described and shown in FIG. 2. The grid structure further includes post means 406 and depending spines as 408. These grid parts are partially covered as shown in FIG. 49 by one component 410 of a composite grid complement means. In combination with this component 410 is a second component generally indicated by the arrow 412 and comprising a molded plastic frame.

The frame 412 is made with spaced apart sides 414, 416, a bottom side 418 and a top side 420 (FIG. 51) which define a space for receiving active material. At spaced apart points the sides 414, 416 are formed with openings as 422, 424 which are centrally arranged to receive spine centering bars as 426, 428. These bars are formed with curved spine engaging portions as 426a, 428a designed to contact opposite spine surfaces in an alternately arranged manner to locate and maintain the spines in a centered relationship with respect to the frame as suggested in FIGS. 55 and 56. At its top side 420 the frame is formed with an elongated aperture 430 which is defined by opposite edges 432, 434. The edges 432, 434 are undercut to provide relieved portions 436, 438.

The component 410 of the composite grid complement is preferably constructed as a molded plastic piece designed to cooperate with the frame component 412. This component, in further combination with retainer mats as later disclosed, supports and confines a pasted active material. Components 410, 412 are preferably formed of a resilient chemically inert material. FIG. 50 shows the grid complement component 410 prior to being compressed about the grid structure.

Included in the component 410 of the composite grid complement is a top bar enclosure part 440, a sleeve 442, and frame insert portions generally indicated by arrows 444, 446. Opposite extremities of grid top bar 404 may be covered by means of end wall parts as 445.

The component 410 includes flexible web parts 444a and 446a (FIG. 50A) which support frame insert portions 444, 446. These insert portions include spine engaging portions as 448 separated by intervening portions as 450. Flexible web parts 444a, 446a are designed to be wrapped around opposite sides of top bar 404 as suggested in FIG. 50A. Projecting outwardly from opposite side of the component 410 are retainer parts 452, 454, which are formed with grooves as 456, 458, and which are designed to engage tightly over the frame edges 432, 434 and hold this component 410 in interlocking relationship with the frame component 412 as suggested in FIG. 54.

By means of this arrangement, the grid portions are protectively enclosed by the composite grid complement component 410 which, in combination with active material, inhibits transfer of antimony from the grid structure to the negative material as previously disclosed. It will be noted that frame component 412 at its upper side may have downwardly extended portions as 413, 415 shown in FIGS. 52-54 and these portions function to inhibit corrosion by lengthening the path of sulfate ion diffusion and thus reducing current density at vulnerable portions of the grid structure in the manner previously described.

The sleeve means 442 may be formed with a tapered upper surface 460 which may be employed to seal the post means 406 within a battery cover in the manner earlier described. Likewise, the sleeve 442 may be employed to shield the post means during electrochemical forming as previously disclosed. The spacer bars 426, 428 and 426b and 428b are installed after engagement of component 410 with frame component 412. This is conveniently carried out by deforming said bars as suggested at 428b in FIG. 55 with opposite ends thereafter being inserted in respective holes as 422, 424. FIG. 56 illustrates the interlocking relationship between the spines as 408 and the centering bars 426 and 428.

Figure 56A:
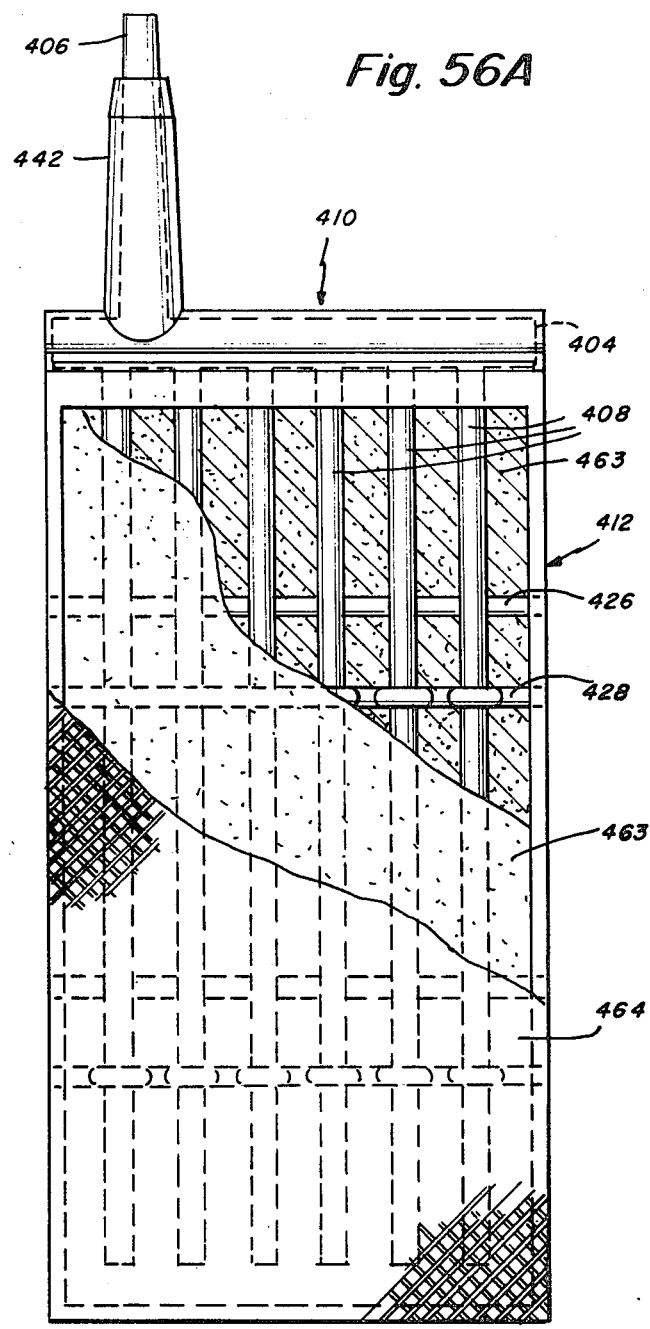
FIG. 56A is a elevational view partly cut away of a pasted type plate of the invention.

The space defined by the frame sides 414, 416, 418 and 420 (FIG. 51) may then be filled with an active material paste 463 of the type customarily employed in making pasted plates as suggested in FIG. 56A. Thereafter, outer retainer mats 464 of glass fibres, plastic screen or the like may be applied and affixed to the frame edges to form the finished plate means as illustrated in FIG. 56A.

FIGS. 57-59 illustrate a pasted type plate of the invention including a modified form of composite grid complement means. As shown in FIG. 57, a grid of the class earlier disclosed includes a top bar 468, post means 470, and spines as 472. This grid structure is provided with a grid complement means consisting of a coating of chemically inert material indicated at 474. This layer or coating may be applied as earlier noted by dipping, brushing or spraying, electrodeposition and the like. In combination with this structure is a specially constructed plastic frame component 476 whose upper side is formed with spaced spine apertures as 478 from which depend inner tubular extensions as 480 and outer depending edges as 481, and which is formed from a chemically inert material.

The frame component 476 is combined with the grid structure and its coating 474, as suggested in FIG. 58, with the spines as 472 being received through spine apertures as 478 and depending extensions as 480. FIG. 57 and 58 illustrate two alternative forms of centering bars both of which are intended to be molded as integral parts of frame component 476. One alternative form of centering bar is indicated at 482 and includes ring portions through which spines as 472 may be inserted. A second alternative consists of two centering bars 484 and 486 arranged to secure the spines in a manner similar to that illustrated in FIG. 56. Either one of these centering bar arrangements contain the spine members as 472 in centrally spaced position with the extremities of the spines being located in spaced relationship to the bottom of frame component 476.

FIG. 59 illustrates frame component 476 in combination with the coated grid structure on a somewhat larger scale and, in particular, illustrates the inclusion of an adhesive 488 or other suitable sealing material for sealably securing the frame component 476 to the remainder of the structure. It is pointed out that, by means of the grid coating 474 and the adhesive layer 488, a relatively thick protecting body is provided at points where the spines as 472 join the top bar 468. The plate assembly described, when filled with a pasted layer of active material and thereafter enclosed within outer mats, comprises a reinforced plate body of significantly strengthened nature conducive to long operating life with increased resistance to deformation.

FIG. 60 illustrates another modification of the grid complement means of the invention intended for use with pasted type plates and FIGS. 61-63 illustrate a method of assembly of this grid complement with a grid structure. As generally indicated by arrow 490, a grid complement means of chemically inert material is provided and includes as an integral part thereof a sleeve portion 492 which has an annular shoulder 494 of tapered shape, designed to fit in sealable relationship through a cell cover in the manner illustrated in FIG. 34, as well as depending edges as 491 shown in FIGS. 60-63.

In combination with grid complement 490 is provided a grid structure similar to that earlier described and including a top bar 496, post means 498 and spines as 500. FIGS. 61-63 illustrate these parts and further indicate a method of installing the grid complement wherein the spines as 500 are first bent over as shown in FIG. 61 and the post means 498 is entered into the lower end of sleeve 492. Thereafter, the grid is advanced, with the top bar 496 engaging against the under side 493 of grid complement 490 as shown in FIGS. 62 and 63. In FIG. 63 the components are shown fully assembled with the spines 500 straightened and located in a centered position against fixed centering bars 502, 504 and being retained in this centered position by additional bars 506 and 508 which are engaged in openings as 510, 512 of the grid complement 490.

It will readily be seen that the assembly of parts illustrated in FIG. 63 results in the post means 498 and top bar 496 being contained by grid complement means 490 and, when the space defined by the sides of the grid complement 490 is filled with pasted active material, all portions of the grid structure will be covered either by active material or by the grid complement 490. Retainer mats may then be added as previously disclosed. The sleeve 492 functions to inhibit formation of lead oxide coating on the post means when the plate is electrochemically formed and a part of the sleeve can be incised or cut away, as has been disclosed in FIG. 33, to eliminate cleaning or brushing.

FIG. 63A illustrates a variation of the grid complement means 490 in which a retainer mat is formed as an integral part of the grid complement means at one side thereof as indicated at 507. This retainer mat may be in the form of a screen as illustrated or may be representative of any type of retainer mat. Such a molded mat arrangement may be utilized with any of the frame components shown in FIGS. 49-76A. In such an arrangement fixed spacing bars as 502a, 504a will be formed so that rear edges lie flush with rear edges of the frame.

FIGS. 64-68 illustrate another type of grid complement means for use with a pasted type plate. This grid complement means, generally denoted by arrow 514, is formed of a resilient chemically inert material which is impermeable to electrolyte. Grid complement means 514 includes a pair of frame sections 516, 518 which are resiliently joined together by means of a grid complement part 520 which, as shown in FIGS. 64 and 65, constitutes an enclosure body for a grid structure having a top bar 522, post means 524 and spines as 526 (FIG. 66). The grid complement part 420 has projecting therefrom a sleeve part 528. One frame section as 518 may include as an integral part thereof a retainer mat 518. Spacer bars 532 will then be formed so that rear edges thereof will be flush with the rear edges of the frame as before.

Assembly of these parts is carried out by entering the post means 524 in the sleeve portions 528 as suggested diagrammatically in FIG. 66. The post means 524 is advanced into the sleeve 528 as shown in FIG. 67 and the frame sections 516, 518 are moved toward one another to compressively locate the grid complement part 520 about the top bar 522 and around upper spine portions of spines as 526 at their points of junction with the top bar, with the centering bars as 530 and 532 engaging against spines as 526 to hold these elements in a properly centered position. Frame sections 516, 518 are then fastened together by fusing or other means and thereafter a pasted active material and retainer mats are applied as before.

It will be noted that this grid complement means 514 encloses the top bar and spine junction points as earlier described and the sleeve 528 functions to protect the post means 524 from $PbO_2$ formation during electrochemical formation. It will also be noted that frame sections 516, 518 are further provided with depending wall portions 517, 519 which serve to lengthen the path of sulfate ion diffusion and therefore reduces current density and corrosion in a manner previously described.

FIGS. 69-71 illustrate still another desirable combination of composite grid complement means intended for use with a pasted type plate. Numeral 540 denotes a frame component which may be molded from a chemically inert material and includes spine retaining parts as 542, centering bars as 544 and depending wall portion as 545. It is intended that the frame component 540 may be employed to receive a grid structure 546 having post means 548 and spines as 550 as shown in FIG. 70. Another component of the composite grid complement consists of a coating 552 applied by dipping, brushing, or the like and applied after assembly of the frame component 540 to the grid structure 546.

Figure 72:
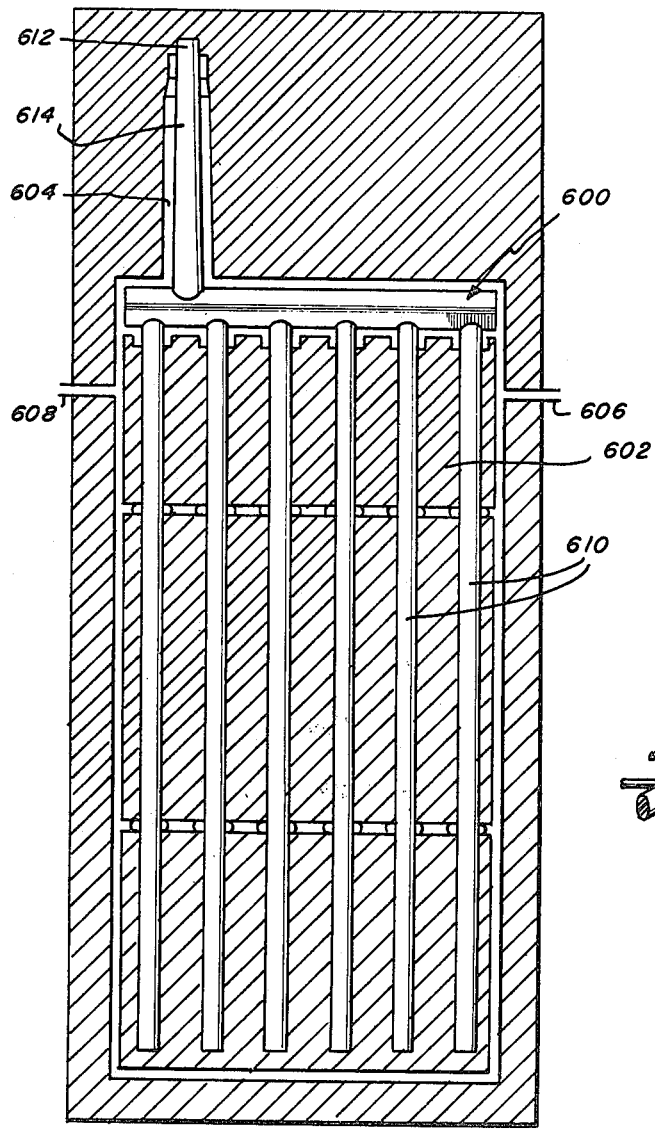
FIG. 72 is a diagrammatic view illustrating a method of injection molding a grid complement layer directly on portions of a grid structure.

It may be desirable to form the grid complement means in other ways as, for example, by injecting molding the grid complement means directly around selected grid surfaces. In FIG. 72 a grid, indicated by arrow 600, is illustrated in combination with one-half of a symmetrical mold 602 for injection molding a grid complement means having a configuration similar to that illustrated in FIG. 60, for example, but with centering bars integral therewith and suitable for use in a pasted type plate. Numeral 604 indicates a mold cavity in which a molten plastic material may be injected through gates as 606 and 608. Spines 610 are supported throughout most of their lengths in contact with the molded surfaces which are formed complementary with the spine shapes. The tip 612 of the post means 614 is supported in a simiar manner. It should be noted that the cross-hatched areas of FIG. 72 indicate surfaces which are to mate with complementary surfaces on another half of the mold (not shown). It will be understood that FIG. 72 is illustrative of one form of mold for a pasted type plate and that, similarly, injection molding may be employed for the fabrication of grid complement means intended for use with a tubular type plate.

The various grid complement means intended for use with pasted type plates and described in FIGS. 49-72 may be further modified and enhanced by the addition of an active material reinforcing network of chemically inert material. Certain desirable forms of this material reinforcing network and plates including such a network are illustrated in FIGS. 73-76A.

The active material reinforcing network may consist of a plurality of sets of spaced apart elements arranged in parallel relationship, said sets overlying one another and the elements of one set being angularly disposed with respect to elements of all other sets.

Figure 73:
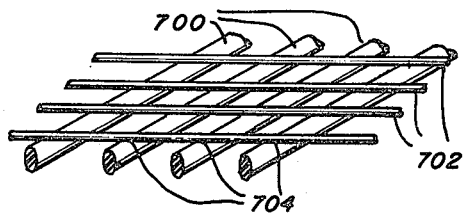

FIG. 73 illustrates such a network consisting of two sets of spaced apart elements, the elements of one set being denoted by numeral 700 and elements of the second set indicated by numeral 702. The elements of the respective sets are joined to one another at points indicated at 704. The elements thus arranged and joined together are embedded in a mass of pasted active material and constitute reinforcing means for a pasted active material in a manner similar to that provided by a reinforcing steel mesh embedded in a concrete body.

It will be noted that any active material body in which a reinforcing means is embedded will be partially divided into "pellets", but nevertheless will consist of a single mass having an electrical conductivity which is continuous throughout the mass. Elements 700, 702, illustrated in FIG. 73, may be of differing cross-sectional size or configuration.

Figure 74:
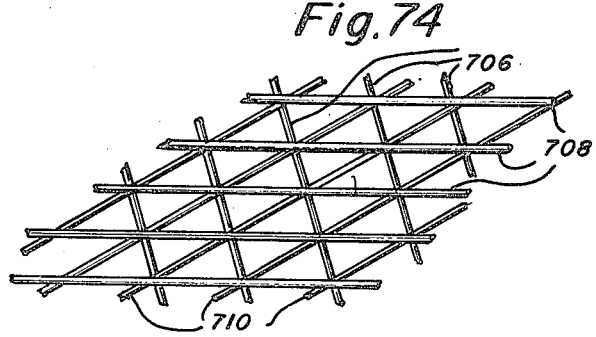

FIG. 74 illustrates another network consisting of three sets of network elements 706, 708, 710, which overlie one another with the elements of any one set being disposed angularly with respect to elements of remaining sets. The elements of the respective sets are joined together as noted in FIG. 73.

The active material reinforcing network may be combined with frame sections of grid complement means similar to those illustrated in FIGS. 49-72 in various ways. One arrangement is illustrated in FIG. 75. In this FIG. 75 there is illustrated a frame section 712 which is similar to the frame section 516 of FIG. 64. Included as an integral part of the frame section 712 are two sets of network elements as 714, 716 respectively. Each of elements 716 is further recessed at points as 718 to provide spine centering means. A completed grid complement means may be provided by combining with the frame section of FIG. 75 a similar frame section (not shown) and other parts as shown in FIGS. 64 and 65. The completed grid complement means may be further combined with a grid structure in the manner shown in FIGS. 66-68. FIG. 75A illustrates a completed plate having a grid complement means denoted by numeral 720 and a grid structure 722. Active material 724 overlies portions of the grid and is confined by the frame sections of the grid complement means. Retainer mats 726 are then added to provide a finished plate.

It should be noted that, although the active material reinforcing network is illustrated in these figures as an integral part of the grid complement means, the network may also be formed separately in a configuration similar to that shown in FIG. 73 or 74 and later joined to an existing grid complement body.

It may be further desired, particularly in the case of relatively thin plates, to eliminate the frame section of the grid complement means entirely. In this case the active material retaining network may be formed separately and fabricated into a "cage" which is then formed or otherwise joined to a grid complement means in which a grid structure has already been received. FIGS. 76 and 76A illustrate such an arrangement in which a grid complement 728 overlies portions of a grid structure including a top bar 730, post means 732 and spines as 734. The cage is denoted by numeral 736. FIG. 76A illustrates this arrangement in partial cross section. It will be seen that vertical elements as 738 of the cage are fused or otherwise joined to downwardly depending walls 740 of grid complement 728. Horizontal elements as 742 may be fused around the spines as 734 by applying heat directly to the grid structure itself. The structure of FIGS. 76 and 76A may be further fabricated into a completed pasted plate by the addition of pasted active material and retainer mats in the manner previously described.

It may be desired to provide a battery in which both positive and negative plates are provided with grid complement means of a suitable type, and in which tubular or pasted type plates are combined in a suitable fashion and in which the grid structure of the plate may or may not have an antimony content with certain advantages derived therefrom.

Figure 77:
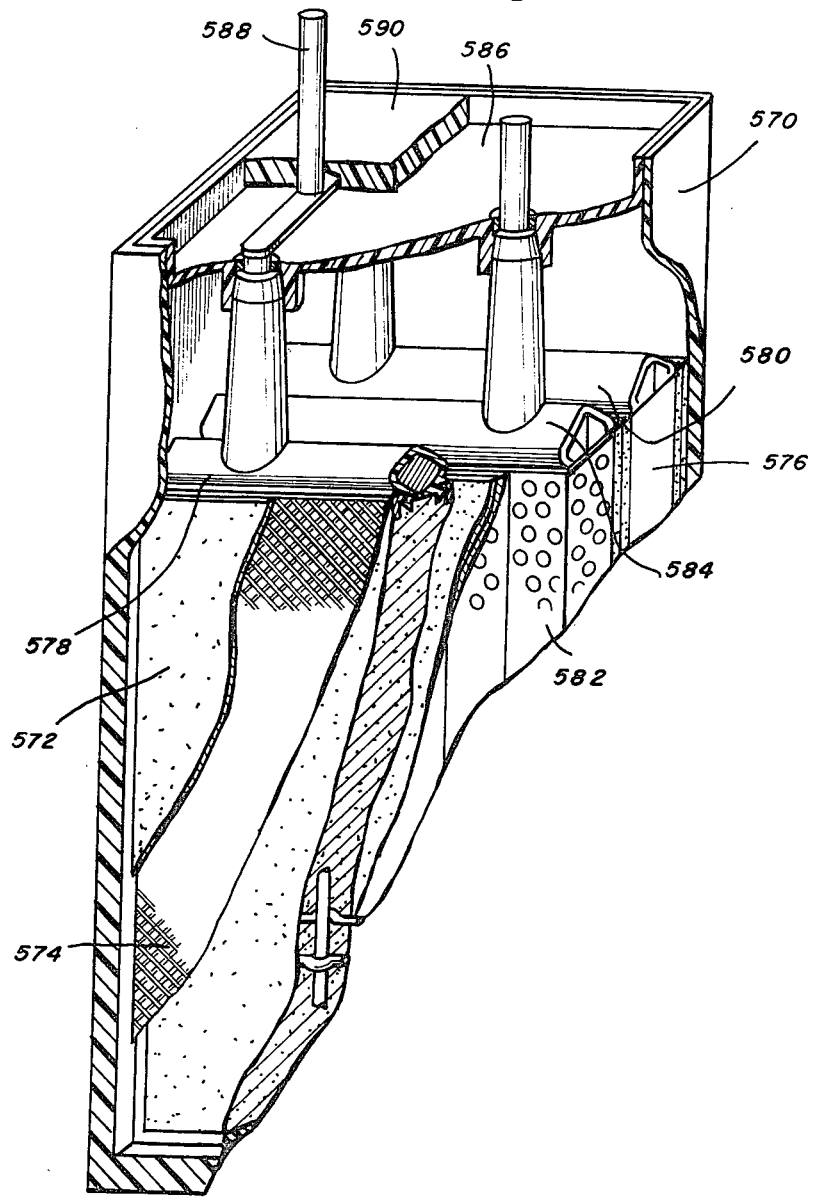
FIG. 77 is a perspective view and partial cross section of a battery in which positive and negative plates are present and both the positive and negative plates are provided with grid complement means of the invention.

FIG. 77 illustrates a battery cell portion in partial cross section in which are combined, along with standard separator materials as 572, plates manufactured in accordance with the invention. The battery cell is comprised of a jar 570 in which are received the various battery components and an electrolyte body (not shown). The cell is sealed at its upper portion in a manner as previously described. Numerals 574 and 576 refer to negative plates of a pasted or "flat" type manufactured in accordance with the method illustrated earlier in FIGS. 49–56A and include composite grid complement means as 578, 580.

Numeral 582 denoes a positive plate of tubular type manufactured in accordance with the method disclosed in FIGS. 6–30 inclusive and includes a grid complement means 584 similar to that described in the aforementioned Figures.

Numeral 586 refers to a cell cover as shown in FIG. 35 and numeral 588 denotes a burning bar and post means interconnecting negative plates 574 and 576 and providing a negative battery terminal as earlier shown in FIG. 35. Numeral 590 indicates an epoxy resin or similar sealing compound applied as noted before.

We claim:

1. In the manufacture of positive plate means for use in a lead-acid battery wherein a molten lead alloy is first formed into a current carrying grid structure having a top bar, post means and a plurality of spaced apart spines joined to the top bar, and wherein active material is received in retaining means in contact with the spaced apart spines, that improvement which comprises enclosing the top bar, post means and portions of the spaced apart spines with grid complement means, said grid complement means being formed of a resilient, chemically inert material impervious to electrolyte, said grid complement being applied in successive steps which include first inserting the post means in a sleeve part of the grid complement, thereafter folding adjoining portions of the grid complement means around the top bar and then slideably inserting depending portions of the grid complement means within the said retaining means for the active material, introducing active material around and in contact with the spines in spaces defined by the retaining means to constitute an unformed positive plate, immersing the said unformed positive plate in an acid bath and electrochemically forming said plate to produce a formed positive plate, and thereafter removing a part of the said sleeve portion to uncover a section of the post means which is free from lead oxide coating which may result from the said electrochemical formation.

2. In the manufacture of positive plate means for use in a lead-acid battery wherein a molten lead alloy having an antimony content is first formed into a current carrying grid structure having a top bar, post means and a plurality of spaced apart spines joined to the top bar, that improved method which includes enclosing the top bar, post means and portions of the spaced apart spines at their points of joinder with the top bar with grid complement means, said grid complement means being formed of a chemically inert material impervious to electrolyte, introducing active material around and in contact with the spines in spaces defined by a retaining means to constitute an unformed positive plate, then engaging the grid complement means in the retaining means, immersing the said unformed positive plate, together with unformed negative plate means, in a common acid bath, supplying an electrical current to provide electrochemical formation of the plates, while substantially inhibiting transfer of antimony in any appreciable amount from enclosed surfaces of the grid structure of the said unformed positive plate to the active material of the negative plate.

3. In the manufacture of plate means for use in a lead-acid battery wherein a molten lead alloy is first formed into a current carrying grid structure having a top bar, post means and a plurality of spaced apart spines joined to the top bar and wherein active material is received in retaining means in contact with the spaced apart spines, that improvement which comprises enclosing the top bar, post means and portions of the spaced apart spines at their points of joinder with the top bar with grid complement means, said grid complement means being formed of a resilient, chemically inert material impervious to electrolyte, then engaging the grid complement means in the said retaining means, and applying the grid complement means in successive steps which include first inserting the post means in a sleeve part of the complement, thereafter folding adjoining portions of the grid complement means around the top bar and the spines at their points of joinder with the top bar and then slideably inserting depending portions of the grid complement means within the said retaining means for the active material.

* * * * *